(12) United States Patent
Taori et al.

(10) Patent No.: US 9,307,421 B2
(45) Date of Patent: Apr. 5, 2016

(54) APPARATUS AND METHOD FOR SETTING UP RADIO FRONT HAUL LINK IN COOPERATIVE COMMUNICATION SYSTEM

(71) Applicant: Samsung Electronics Co. Ltd., Suwon-si, Gyeonggi-do (KR)

(72) Inventors: Rakesh Taori, Suwon-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/035,152

(22) Filed: Sep. 24, 2013

(65) Prior Publication Data

US 2014/0087750 A1 Mar. 27, 2014

(30) Foreign Application Priority Data

Sep. 24, 2012 (KR) ........................ 10-2012-0105964

(51) Int. Cl.
| | | |
|---|---|---|
| *H04W 72/00* | (2009.01) | |
| *H04W 24/02* | (2009.01) | |
| *H04W 36/00* | (2009.01) | |
| H04W 24/04 | (2009.01) | |
| H04W 24/00 | (2009.01) | |
| H04W 84/04 | (2009.01) | |
| H04W 84/08 | (2009.01) | |

(52) U.S. Cl.
CPC .......... *H04W 24/02* (2013.01); *H04W 36/0083* (2013.01); *H04W 24/00* (2013.01); *H04W 24/04* (2013.01); *H04W 84/045* (2013.01); *H04W 84/08* (2013.01)

(58) Field of Classification Search
CPC ...... H04W 16/00; H04W 16/10; H04W 16/32; H04W 24/02; H04W 24/10; H04W 28/00; H04W 28/10; H04W 72/046; H04W 84/045
USPC .............. 455/446, 448, 449, 452.1, 453, 436, 455/437, 438, 561
See application file for complete search history.

(56) References Cited

U.S. PATENT DOCUMENTS

| | | | | |
|---|---|---|---|---|
| 8,305,975 | B2 * | 11/2012 | Tortora | ......................... 370/329 |
| 8,725,151 | B2 * | 5/2014 | Xu | .................... H04W 36/0033 |
| | | | | 455/436 |
| 8,824,413 | B2 * | 9/2014 | Goldhammer | ................ 370/330 |
| 2004/0001442 | A1 | 1/2004 | Rayment et al. | |
| 2004/0137924 | A1 | 7/2004 | Herscovich et al. | |
| 2007/0015511 | A1 * | 1/2007 | Kwun et al. | ................... 455/436 |
| 2008/0080364 | A1 | 4/2008 | Barak et al. | |
| 2008/0090575 | A1 | 4/2008 | Barak et al. | |
| 2009/0258652 | A1 | 10/2009 | Lambert et al. | |

(Continued)

FOREIGN PATENT DOCUMENTS

| | | |
|---|---|---|
| JP | 2012-151841 A | 8/2012 |
| KR | 10-2010-0105485 A | 9/2010 |

*Primary Examiner* — Jean Gelin
(74) *Attorney, Agent, or Firm* — Jefferson IP Law, LLP

(57) ABSTRACT

A method for setting up a radio front haul link by a serving Base Station (BS) in a cooperative communication system is provided. The method includes receiving a measurement result report message including a measurement result for each of a serving BS and neighbor BSs, determining at least one neighbor BS with which the serving BS will set up a radio front haul link according to the measurement result for each of the serving BS and the neighbor BSs, and performing a radio front haul link set up operation with the at least one neighbor BS.

30 Claims, 14 Drawing Sheets

(56) References Cited

U.S. PATENT DOCUMENTS

| | | |
|---|---|---|
| 2009/0323621 A1 | 12/2009 | Touboul et al. |
| 2010/0254344 A1 | 10/2010 | Wei et al. |
| 2011/0038308 A1 | 2/2011 | Song et al. |
| 2011/0116480 A1* | 5/2011 | Li et al. .................. 370/332 |
| 2011/0300887 A1* | 12/2011 | Osterling .......... H04W 52/0206 455/507 |
| 2012/0063383 A1 | 3/2012 | Barbieri et al. |
| 2012/0147805 A1 | 6/2012 | Kim et al. |
| 2012/0177373 A1 | 7/2012 | Choi et al. |
| 2013/0194982 A1* | 8/2013 | Fwu et al. .................. 370/280 |
| 2013/0260768 A1* | 10/2013 | Guo .................. H04W 36/08 455/438 |
| 2014/0031040 A1* | 1/2014 | Lee et al. .................. 455/437 |
| 2014/0206361 A1* | 7/2014 | Centonza et al. ............ 455/444 |

* cited by examiner

APPARATUS AND METHOD FOR SETTING UP RADIO FRONT HAUL LINK IN COOPERATIVE COMMUNICATION SYSTEM

CROSS-REFERENCE TO RELATED APPLICATION(S)

This application claims the benefit under 35 U.S.C. §119 (a) of a Korean patent application filed on Sep. 24, 2012 in the Korean Intellectual Property Office and assigned Serial No. 10-2012-0105964, the entire disclosure of which is hereby incorporated by reference.

TECHNICAL FIELD

The present disclosure relates to an apparatus and method for setting up a radio front haul link in a cooperative communication system.

BACKGROUND

FIG. 1 schematically illustrates an operation of connecting Base Stations (BSs) using a point-to-point scheme in a general wireless communication system.

Referring to FIG. 1, a wireless communication system 100 includes a plurality of BSs, and any two BSs may be connected using a radio back haul link. The radio back haul link is set up by connecting a BS with another BS using a point-to-point scheme for an access link 110, and the respective BSs may have different hardware and/or hardware configurations. For example, in order to connect a BS 1 with the other 18 BSs, those being BS 2 to BS 19, eighteen hardware elements are needed for the BS 1 to perform a radio backhaul communication with the other eighteen BSs within a 3-tier communication system as shown in FIG. 1.

As described in FIG. 1, a general radio back haul interface uses an excessive amount of hardware, that is, a large amount of hardware is needed, so the general radio back haul interface is improper to dynamically or adaptively support a radio back haul interface by reflecting a status of an access link, such as a small cell cooperative communication. Here, the amount of hardware may correlate to the number of BSs which will connect via a radio back haul.

Meanwhile, in the wireless communication system, setting up a radio front haul link as well as the radio back haul may be an important factor for influencing a performance for the wireless communication system. So, in the wireless communication system, setting up a radio front haul link, which is set up using the radio back haul link that is set up the operation described in FIG. 1, may cause the same problem as the radio back haul link set up operation.

Recently, a study for a cooperative communication system has been actively progressed for providing a best service to Mobile Stations (MSs). However, a detailed radio front haul link set up operation has not been concretely proposed.

Accordingly, there is a need for setting up a radio front haul link in a cooperative communication system thereby minimizing a hardware requirement and adaptively reflecting a channel status.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for setting up a radio front haul link in a cooperative communication system.

Another aspect of the present disclosure is to provide an apparatus and method for setting up a radio front haul link in a cooperative communication system thereby minimizing hardware needed.

Still another aspect of the present disclosure is to provide an apparatus and method for setting up a radio front haul link in a cooperative communication system thereby adaptively reflecting a channel status.

In accordance with an aspect of the present disclosure, a serving Base Station (BS) in a cooperative communication system is provided. The serving BS includes a receiver configured to receive a measurement result report message including a measurement result for each of a serving BS and neighbor BSs, and a controller configured to determine at least one neighbor BS with which the serving BS will set up a radio front haul link according to the measurement result for each of the serving BS and the neighbor BSs, and configured to perform a radio front haul link set up operation with the at least one neighbor BS.

In accordance with another aspect of the present disclosure, a neighbor BS in a cooperative communication system is provided. The neighbor BS includes a controller configured to detect that a neighbor BS will set up a radio front haul link with a serving BS, and configured to perform a radio front haul link setup operation with the serving BS.

In accordance with another aspect of the present disclosure, a Mobile Station (MS) in a cooperative communication system is provided. The MS includes a controller configured to perform a measurement operation for each of a serving BS and neighbor BSs, and a transmitter configured to transmit a Radio Frequency (RF) signal, wherein the controller is configured to control the serving BS and the neighbor BSs to perform a radio front haul link set up operation by controlling the transmitter to transmit a measurement result report message including a measurement result for each of the serving BS and the neighbor BSs to the serving BS.

In accordance with another aspect of the present disclosure, a Self Organizing Network (SON) server in a cooperative communication system is provided. The SON server includes a receiver configured to receive a radio front haul link set up help message which requests a SON server to transmit a wake up message indicating that a neighbor BS will set up a radio front haul link with a serving BS to the neighbor BS from the serving BS, and a transmitter configured to transmit the wake up message to the neighbor BS.

In accordance with another aspect of the present disclosure, a method for setting up a radio front haul link by a serving BS in a cooperative communication system is provided. The method includes receiving a measurement result report message including a measurement result for each of a serving BS and neighbor BSs, determining at least one neighbor BS with which the serving BS will set up a radio front haul link according to the measurement result for each of the serving BS and the neighbor BSs, and performing a radio front haul link set up operation with the at least one neighbor BS.

In accordance with another aspect of the present disclosure, a method for setting up a radio front haul link by a neighbor BS in a cooperative communication system is provided. The method includes determining whether a neighbor BS will set up a radio front haul link with a serving BS, and performing a radio front haul link setup operation with the serving BS.

In accordance with another aspect of the present disclosure, a method for setting up a radio front haul link by a MS in a cooperative communication system is provided. The method includes performing a measurement operation for each of a serving BS and neighbor BSs, and controlling the serving BS and the neighbor BSs to perform a radio front haul link set up operation by transmitting a measurement result report message, including a measurement result for each of the serving BS and the neighbor BSs, to the serving BS.

In accordance with another aspect of the present disclosure, a method for setting up a radio front haul link by a SON server in a cooperative communication system is provided. The method includes receiving a radio front haul link set up help message which requests a SON server to transmit a wake up message indicating that a neighbor BS will set up a radio front haul link with a serving BS to the neighbor BS from the serving BS, and transmitting the wake up message to the neighbor BS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An embodiment of the present disclosure provides an apparatus and method for setting up a radio front haul link in a cooperative communication system.

Another embodiment of the present disclosure provides an apparatus and method for setting up a radio front haul link in a cooperative communication system thereby minimizing hardware needed.

Still another embodiment of the present disclosure provides an apparatus and method for setting up a radio front haul link in a cooperative communication system thereby adaptively reflecting a channel status.

An apparatus and method provided according to an embodiment of the present disclosure may be applied to various wireless communication systems as well as the cooperative communication system. Further, it will be understood by those of ordinary skill in the art that a serving Base Station (BS) in the cooperative communication system may be a serving BS in other wireless communication systems.

Figure 1:
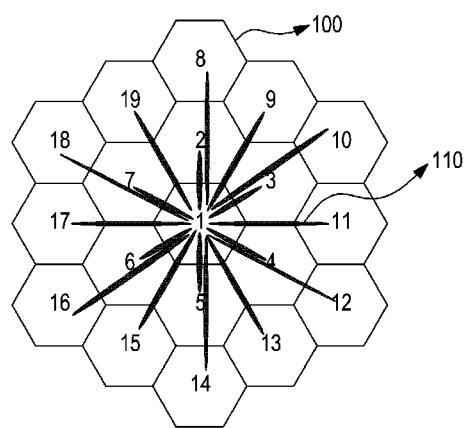
FIG. 1 schematically illustrates an operation of connecting Base Stations (BSs) using a point-to-point scheme in a general wireless communication system according to related art.
Figure 2:
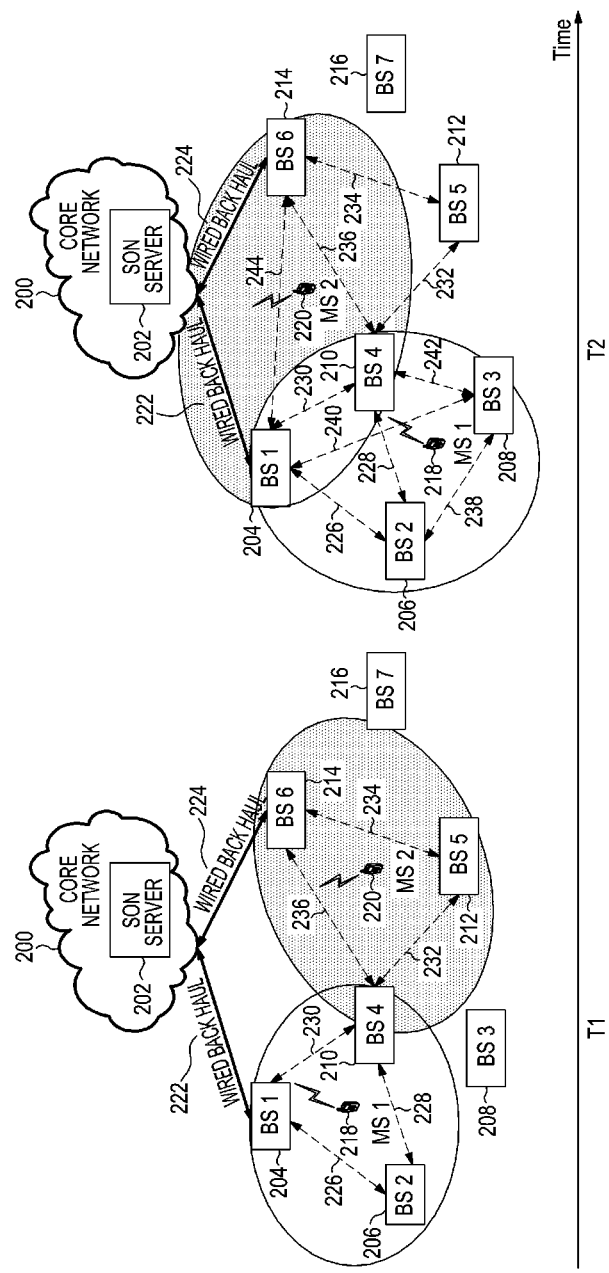
FIG. 2 schematically illustrates a structure of a cooperative communication system according to an embodiment of the present disclosure.

FIG. 2 schematically illustrates a structure of a cooperative communication system according to an embodiment of the present disclosure.

Referring to FIG. 2, a cooperative communication system includes a Self Organizing Network (SON) server 202, a BS 1 204, a BS 2 206, a BS 3 208, a BS 4 210, a BS 5 212, a BS 6 214, a BS 7 216, a Mobile Station (MS) 218, and an MS 2 220.

The SON server 202 is located in a Core Network (CN) 200, and manages setting information, location information, status information, and any other similar and/or suitable type of information, for each BS. For example, the status information includes operation mode information indicating that a related BS operates in an active mode or a dormant mode, or other similar and/or suitable operation mode information.

Each of the BSs 204 to 216 recognizes SON server information on the SON server 202, such as address information, in advance, and the BSs 204, 206, 210, 212, and 214, which operate in the active mode from among the BSs 204 to 216, maintain logical connections 250 to 258 (not shown) with the SON server 202, so that a radio front haul link communication, from among the BSs 204, 206, 210, 212, and 214, and/or information used for communication with the MSs 218, 220 may be acquired through communication with the SON server 202.

The SON server 202 performs an operation in which the SON server 202 relays signaling for setting up a radio front haul link among the BSs 204, 206, 210, 212, and 214 which operate in the active mode, or manages and/or maintains information on a radio front haul link monitoring window that is used for performing the radio front haul link set up operation, and such information may be referred to as radio front haul link monitoring window information, according to an embodiment of the present disclosure. The radio front haul link window information includes information on a period, a start timing point and a length of the radio front haul link monitoring window.

The BS 1 204 and the BS 6 214 are respectively connected to the CN 200 through wired backhaul links 222 and 224. The BS 2 206 through the BS 5 212 and the BS 7 216 have not set up a wired backhaul link with the CN 200 in the embodiment of FIG. 2.

At an arbitrary timing point T1, the BS 1 204, the BS 2 206, and the BS 4 210, which are wirelessly connected one another, provide a cooperative service to the MS 1 218 by operating radio front haul links 226, 228, and 230. The BS 4 210, the BS 5 212, and the BS 6 214, which are wirelessly connected one another, provide a cooperative service to the MS 2 220 by operating radio front haul links 232, 234, and 236.

At an arbitrary timing point T2, the BSs 204 to 210 provide a cooperative service to the MS 1 218 by operating a radio front haul link. The BS 1 204, the BS 4 210, and the BS 6 214 provide a cooperative service to the MS 2 220 by operating another radio front haul link. That is, at the arbitrary timing point T2, the BS 1 204, the BS 2 206, and the BS 4 210 will set up radio front haul links 238, 240, and 242 with the BS 3 208, and the BS 1 204 will set up a radio front haul link 244 with the BS 6 214. At the arbitrary timing point T1, the BS 1 204 has not set up the radio front haul link with the BS 6 214, so the BS 1 204 will set up the radio front haul link 244 with the BS 6 214 at the arbitrary timing point T2.

At the arbitrary timing point T1, the BS 3 208 has not set up a radio front haul link with the BS 1 204, the BS 2 206, and the BS 4 210, so the BS 3 208 will respectively set up the radio front haul links 240, 238, and 242, with the BS 1 204, the BS 2 206, and the BS 4 210 at the arbitrary timing point T2. So, an additional operation in which BSs that have not set up a radio front haul link at the arbitrary timing point T1 and will set up the radio front haul link at the arbitrary timing point T2 will be described below.

The radio front haul links 226, 228, 230, 232, 234, 236, 238, 240, 242, and 244 may be operated in the same band as a radio access link between the MS 1 218 and the MS 2 220. In this case, a resource may be used based on a Spatial Division Multiple Access (SDMA) scheme or any other similar and/or suitable scheme. However, the present embodiment is not limited thereto, and the radio front haul links 226, 228, 230, 232, 234, 236, 238, 240, 242, and 244 may be operated in a band different from the radio access link between the MS 1 218 and the MS 2 220. The radio front haul link, the radio access link and the backhaul link may be operated using a separate hardware.

Figure 3:
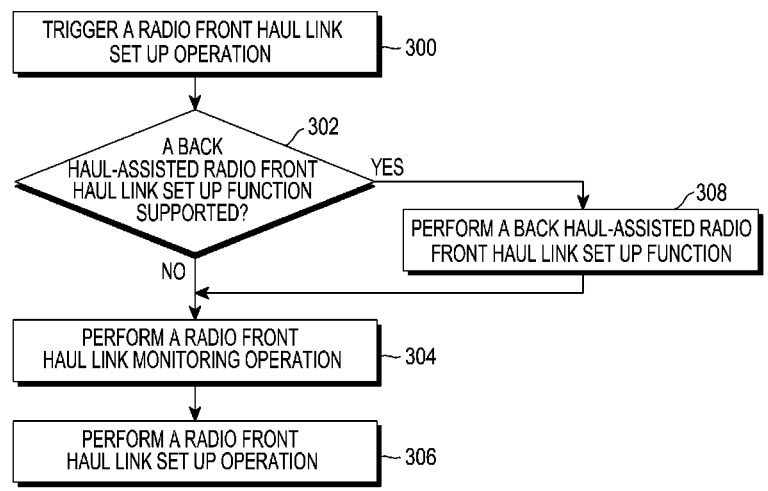
FIG. 3 schematically illustrates a process for setting up a radio front haul link in a cooperative communication system according to an embodiment of the present disclosure.

FIG. 3 schematically illustrates a process for setting up a radio front haul link in a cooperative communication system according to an embodiment of the present disclosure.

Referring to FIG. 3, a radio front haul link set up operation is triggered by an MS in operation 300. The radio front haul link set up operation is triggered by transmitting a measurement result report message from the MS to a serving BS. The measurement result report message and a measurement result, which is included in the measurement result report message, will be described below. Related BSs, such as the serving BS and neighbor BSs, determine whether the cooperative communication system supports a back haul-assisted radio front haul link set up function in operation 302. The back haul-assisted radio front haul link set up function denotes a function in which a radio front haul link is set up by having help from a SON server which is connected to the related BSs through a backhaul link. If the cooperative communication system supports the back haul-assisted radio front haul link set up function, then the related BSs perform the back haul-assisted radio front haul link set up function in operation 308.

If the cooperative communication system does not support the back haul-assisted radio front haul link set up function, then the related BSs perform a radio front haul link monitoring operation corresponding to a radio front haul link monitoring window in operation 304. Here, hardware used in the radio front haul link monitoring operation may be implemented with separate hardware different from the hardware used in performing a communication with the MS or the hardware used in performing communication with other BSs which maintain the radio front haul link.

The serving BS sets up a radio front haul link by performing a radio front haul link set up operation in operation 306. In FIG. 3, BSs which performed the radio front haul link set up operation with the serving BS may be a member of a monitoring BS set corresponding to the MS or a member of a context sharing BS set corresponding to the MS. The monitoring BS set corresponding to the MS corresponds to neighbor BSs which the MS will continuously monitor for determining a possibility for selecting a slave BS which will provide a service to the MS or for selecting a new serving BS from among neighbor BSs for the serving BS.

The context sharing BS set corresponding to the MS corresponds to the neighbor BSs for the serving BS which share a context needed for providing a service to the MS, for example, a static context such as a security key, addressing, a service type, a service parameter, or any other similar and/or suitable type of information or contexts.

Figure 4:
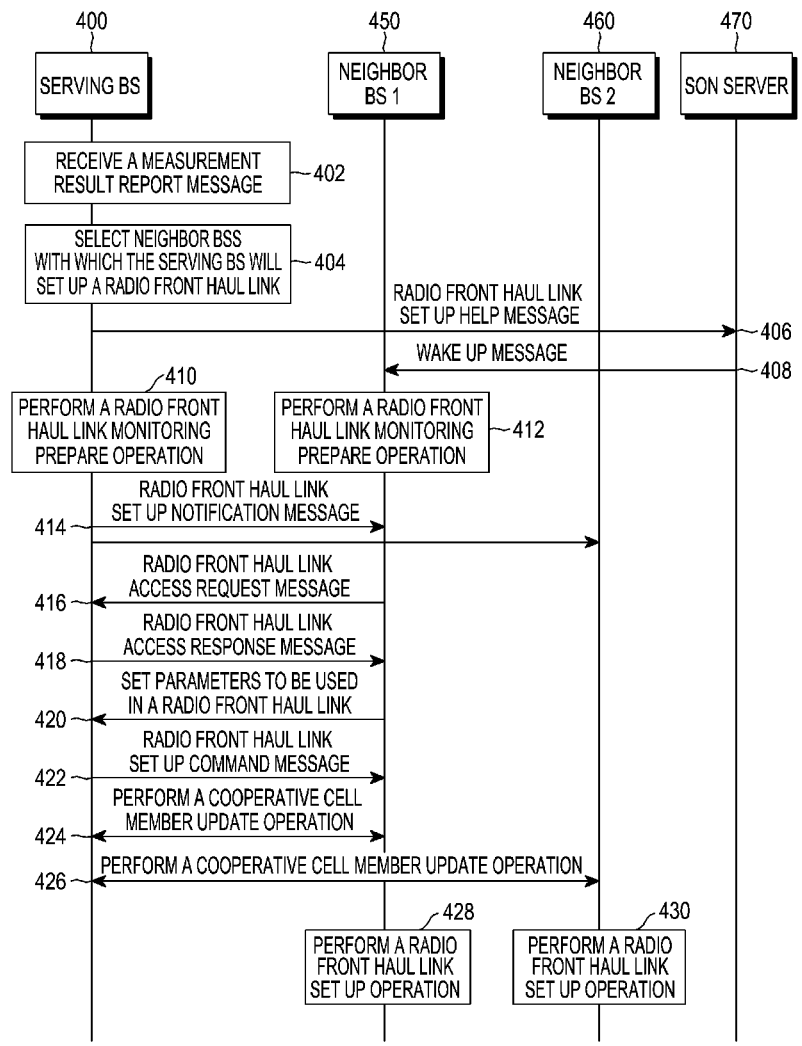
FIG. 4 schematically illustrates a process for setting up a radio front haul link in a cooperative communication system according to an embodiment of the present disclosure.

FIG. 4 schematically illustrates a process for setting up a radio front haul link in a cooperative communication system according to an embodiment of the present disclosure.

Referring to FIG. 4, for example, the cooperative communication system includes a serving BS 400, a neighbor BS 1 450, a neighbor BS 2 460, a SON server 470, and an MS (not shown in FIG. 4).

The serving BS 400 receives a measurement result report message from the MS in operation 402. The serving BS 400 selects neighbor BSs with which the serving BS 400 will set up a radio front haul link based on a measurement result included in the measurement result report message in operation 404. The measurement result report message includes a measurement result for each of reference signals transmitted from the serving BS 400 and neighbor BSs, and also includes BS information on each of the serving BS 400 and the neighbor BSs. For example, the reference signal may be a pilot signal. The BS information includes BS IDentifier (ID) information, and other similar and/or suitable information.

For example, the measurement result may indicate received signal strength, and may be a Signal to Interference and Noise Ratio (SINR), a Signal to Noise Ratio (SNR), a Received Signal Strength Indicator (RSSI), a Channel Quality Indicator (CQI), or any other similar and/or suitable measurement and/or indicator.

For convenience, in FIG. 4, it is assumed that the neighbor BS 1 450 is selected as a neighbor BS with which the serving BS 400 will set up the radio front haul link, and it will be understood by those of ordinary skill in the art that the number of the neighbor BSs with which the serving BS 400 will set up the radio front haul link is not limited and a serving BS may select a plurality of neighbor BSs with which to set up radio front haul links. For example, the MS may include BS information and measured results for neighbor BSs which have a received signal strength equal to or greater than a preset threshold received signal strength in the measurement result report message. In FIG. 4, the measurement result report message includes BS information and measurement results for the neighbor BS 1 450 and the neighbor BS 2 460. The measurement result report message may include at least one of a measurement result for a neighbor BS which transmits a reference signal equal to or greater than the threshold received signal strength, a measurement result for all neighbor BSs included in the monitoring BS set for the MS, and a measurement result for all neighbor BSs included in a neighbor BS list.

The serving BS 400 transmits a radio front haul link set up help message to the SON server 470 in operation 406. The radio front haul link set up help message denotes a message which requests the SON server 470 to transmit a wake up message, which indicates that there is a need for setting up a radio front haul link, to a neighbor BS which is selected as a neighbor BS with which the serving BS 400 will set up a radio front haul link, such as the neighbor BS 1 450. For example, the radio front haul link set up help message includes BS information indicating neighbor BSs which are needed in order to set up the radio front haul link, radio front haul link monitoring window information, and any other similar and/or suitable information. The BS information may include BS ID information of a related BS, and the radio front haul link monitoring window information may include information on a period, a start timing point, length information of the radio front haul link monitoring window, and any other similar and/or suitable information. The radio front haul link set up help message may be implemented by a new message different from messages used in the cooperative communication system, or may be implemented by modifying a specific message from among the messages used in the cooperative communication system.

After receiving the radio front haul link set up help message, the SON server 470 transmits the wake up message to the neighbor BS 1 450 in operation 408. The wake up message includes BS information of the serving BS 400, BS information of the neighbor BS with which the serving BS 400 will set up the radio front haul link, such as the neighbor BS 1 450, radio front haul link monitoring window information, and any other similar and/or suitable information. Here, the BS information and the radio front haul link monitoring window information may be equivalent to the BS information and the radio front haul link monitoring window information included in the radio front haul link set up help message. The wake up message may be implemented by a new message different from messages used in the cooperative communication system, or may be implemented by modifying a specific message from among the messages used in the cooperative communication system.

After receiving the wake up message, the neighbor BS 1 450 performs a radio front haul link monitoring prepare operation for the serving BS 400 based on the radio front haul link monitoring window information included in the wake up message in operation 412. The radio front haul link monitoring prepare operation denotes an operation in which the neighbor BS 1 450 checks a start timing point of a radio front haul link monitoring window to be operated within the closet time based on the radio front haul link monitoring window information, which may include information on a period, a start timing point and a length of the radio front haul link monitoring window.

Also, the serving BS 400 performs the radio front haul link monitoring prepare operation in operation 410. The serving BS 400 broadcasts a radio front haul link set up notification message in operation 414. The radio front haul link set up notification message includes BS information on a neighbor BS, such as the neighbor BS 1 450, which will set up a radio front haul link with the serving BS 400.

After receiving the radio front haul link set up notification message, the neighbor BS 1 450 detects that the BS information on the neighbor BS 1 450 is included in the radio front haul link set up notification message, and, although now shown in FIG. 4, the neighbor BS 1 450 may transmit a radio front haul link set up confirm message as a response message to the radio front haul link set up notification message to the serving BS 400. The radio front haul link set up confirm message may include information indicating that the neighbor BS 1 450 accepts or rejects the setting up of the radio front haul link with the serving BS 400, and may include a rejection reason if the information indicates that the neighbor BS 1 450 rejects the setting up of the radio front haul link with the serving BS 400 if needed. In FIG. 4, it is assumed that the neighbor BS 1 450 accepts the setting up of the radio front haul link with the serving BS 400.

Even though the neighbor BS 2 460 receives the radio front haul link set up notification message from the serving BS 400, the neighbor BS 2 460 may discard the radio front haul link set up notification message since the BS information included in the radio front haul link set up notification message is the BS information corresponding to the neighbor BS 1 450 rather than the BS information corresponding to the neighbor BS 2 460 (not shown in FIG. 4).

After receiving the radio front haul link set up notification message, the neighbor BS 1 450 transmits a radio front haul link access request message to the serving BS 400 in operation 416. After receiving the radio front haul link access request message from the neighbor BS 1 450, the serving BS 400 transmits a radio front haul link access response message, as a response message to the radio front haul link access request message, to the neighbor BS 1 450 in operation 418. Here, operations 416 to 418 correspond to an operation indicating a start of a radio front haul link set up operation and an operation in which the serving BS 400 and the neighbor BS 1 450 acquire a synchronization. The serving BS 400 and the neighbor BS 1 450 set parameters to be used in the radio front haul link, such as radio front haul link ID information, security key information, connection ID information, and other similar and/or suitable information in operation 420.

If the neighbor BS 1 450 performs a radio front haul link set up operation with other neighbor BSs managed by the serving BS 400, then the serving BS 400 transmits a radio front haul link command message to the neighbor BS 1 450 in operation 422. The radio front haul link command message includes BS information corresponding to other neighbor BSs with which the neighbor BS 1 540 will set up a radio front haul link. For example, in FIG. 4, it is assumed that the other neighbor BSs, with which the neighbor BS 1 450 will set up the radio front haul link, includes a neighbor BS 2 460.

If the neighbor BS 1 450 is a cooperative cell member BS included in a cooperative cell which the serving BS 400 manages, then the serving BS 400 performs a cooperative cell member update operation with the neighbor BS 1 450 in operation 424. If the neighbor BS 2 460 is a cooperative cell member BS included in the cooperative cell which the serving BS 400 manages, then the serving BS 400 performs a cooperative cell member update operation with the neighbor BS 2 460 in order to notify the neighbor BS 2 460 that the neighbor BS 1 450 is newly included into the cooperative cell as a cooperative cell member BS in operation 426. While the serving BS 400 performs the cooperative cell member update operation, as described in operation 426, the serving BS 400 may transmit a radio front haul link set up command message indicating that the neighbor BS 2 460 will perform a radio front haul link set up operation with the neighbor BS 1 450 which is added as the cooperative cell member BS to the neighbor BS 2 460.

Each of the neighbor BS 1 450 and the neighbor BS 2 460 respectively performs the radio front haul link set up operations 428 and 430. The radio front haul link set up operations in operations 428 and 430 are identical to operations in operations 416 to 418, so a detailed description will be omitted herein.

Figure 5:
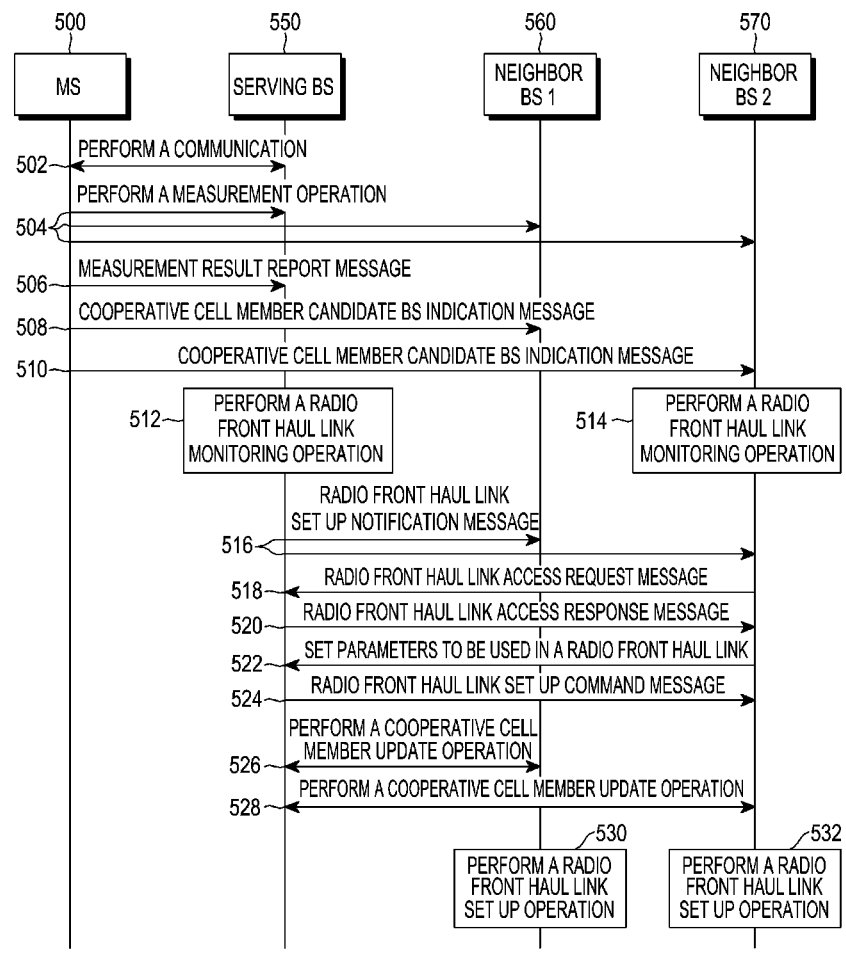
FIG. 5 schematically illustrates a process for setting up a radio front haul link in a cooperative communication system according to an embodiment of the present disclosure.

FIG. 5 schematically illustrates a process for setting up a radio front haul link in a cooperative communication system according to an embodiment of the present disclosure.

Referring to FIG. 5, for example, the cooperative communication system includes an MS 500, a serving BS 550, a neighbor BS 1 560, and a neighbor BS 2 570.

While the MS 500 communicates with the serving BS 550 in operation 502, the MS 500 performs a measurement operation for the serving BS 550 and neighbor BSs in operation 504. The measurement operation denotes an operation in which the MS 500 acquires a measurement result for reference signals transmitted from the serving BS 550 and the neighbor BSs, and the measurement operation has been described in FIG. 4, so a detailed description will be omitted herein.

After performing the measurement operation, the MS 500 transmits a measurement result report message including a measurement result to the serving BS 550 in operation 506. The measurement result has been described in FIG. 4, so a detailed description will be omitted herein. In FIG. 5, it is assumed that BS information on the neighbor BS 1 560 and the neighbor BS 2 570 as well as a measurement result for the neighbor BS 1 560 and the neighbor BS 2 570 is included in the measurement result report message. After receiving the measurement result report message, the serving BS 550 determines whether there is a need for setting up a radio front haul link with the neighbor BS 1 560 and the neighbor BS 2 570 (not shown in FIG. 5).

The MS 500 transmits a cooperative cell member candidate BS indication message, which indicates that a related BS is a cooperative cell member candidate BS which may provide a service to the MS 500, to the neighbor BS 1 560 and the neighbor BS 2 570 in operations 508 and 510. The cooperative cell member candidate BS indication message is used for indicating that the neighbor BS 1 560 and the neighbor BS 2 570 will set up a radio front haul link with the serving BS 550, which serves the MS 500. For example, the cooperative cell member candidate BS indication message may be implemented in a form of a message including MS ID information for the MS 500 and BS ID information for the serving BS 550, or a scrambling code, or any other similar and/or suitable information. Further, it will be understood by those of ordinary skill in the art that an implementation format for the cooperative cell member candidate BS indication message is not limited thereto, and that the cooperative cell member candidate BS indication message may have any suitable implementation format. The cooperative cell member candidate BS indication message may be implemented by a new message different from messages used in the cooperative communication system, or may be implemented by modifying a specific message among the messages used in the cooperative communication system.

After receiving the cooperative cell member candidate BS indication message, the neighbor BS 1 560 and the neighbor BS 2 570 determine whether a radio front haul link has been already set up with the serving BS 550 or whether there is a need for setting up the radio front haul link with the serving BS 550 (not shown in FIG. 5).

For example, in FIG. 5, it is assumed that the radio front haul link between the serving BS 550 and the neighbor BS 1 560 has been already set up, and that the radio front haul link between the serving BS 550 and the neighbor BS 2 570 has not been already set up. So, the neighbor BS 1 560 does not perform an additional operation for setting up the radio front haul link with the serving BS 550.

The serving BS 550 and the neighbor BS 2 570 respectively perform a radio front haul link monitoring operation for setting up the radio front haul link in operations 512 and 514. The radio front haul link monitoring operation is performed based on radio front haul link monitoring window information, and the radio front haul link monitoring operation has been described above so a detailed description will be omitted herein. It is assumed that start timing point information included in the radio front haul link monitoring window information is set as information corresponding to a timing point after "X" time from a timing point at which at least one of the measurement result report message or the cooperative cell member candidate BS indication message has been received from the MS 500. If the start timing point information is not preset in the cooperative communication system, then the start timing point information for the radio front haul link monitoring window may be included in the cooperative cell member candidate BS indication.

The serving BS 550 broadcasts a radio front haul link set up notification message, including information on a neighbor BS with which the serving BS 550 will set up a radio front haul link in the radio front haul link monitoring window, in operation 516. For example, in FIG. 5, it is assumed that the information on the neighbor BS included in the radio front haul link set up notification message is BS information on the neighbor BS 2 570. Even though both of the neighbor BS 1 560 and the neighbor BS 2 570 receive the radio front haul link set up notification message broadcast from the serving BS 550, the BS information on the neighbor BS 2 570 is included in the radio front haul link set up notification message, so the neighbor BS 1 560 may discard the received radio front haul link set up notification message and the neighbor BS 2 570 may transmit a radio front haul link set up confirm message indicating that the neighbor BS 2 570 accepts or rejects to set up the radio front haul link with the serving BS 550 (not shown in FIG. 5). The radio front haul link set up confirm message may include a rejection reason if the neighbor BS 2 570 rejects the setting up of the radio front haul link with the serving BS 550, and the rejection reason has been described in FIG. 4, so a detailed description will be omitted herein.

The neighbor BS 2 570 transmits a radio front haul link access request message to the serving BS 550 according to the receiving of the radio front haul link set up message in operation 518. After receiving the radio front haul link access request message from the neighbor BS 2 570, the serving BS 550 transmits a radio front haul link access response message, as a response message to the radio front haul link access request message, to the neighbor BS 2 570 in operation 520. Here, operations 518 and 520 correspond to an operation indicating a start of a radio front haul link set up operation and an operation in which a synchronization between the serving BS 550 and the neighbor BS 2 570 is acquired. The serving BS 550 and the neighbor BS 2 570 set parameters to be used in the radio front haul link, such as radio front haul link ID information, security key information and connection ID information in operation 522.

If the neighbor BS 2 570 additionally performs a radio front haul link set up operation with other neighbor BSs which the serving BS 550 manages, then the serving BS 550 transmits a radio front haul link set up command message to the neighbor BS 2 570 in operation 524. The radio front haul link set up command message includes BS information on the neighbor BSs with which the neighbor BS 2 570 will additionally set up a radio front haul link. If the neighbor BS 1 560 is a cooperative cell member BS, which is included in a cooperative cell which the serving BS 550 manages, then the serving BS 550 performs a cooperative cell member update operation with the neighbor BS 1 560 in operation 526. During the cooperative cell member update operation, the serving BS 550 may transmit a radio front haul link set up command message, which indicates that the neighbor BS 1 560 will perform a radio front haul link set up operation with the neighbor BS 2 570, which is added to the cooperative cell as a cooperative cell member BS, to the neighbor BS 1 560.

If the neighbor BS 2 570 is included in the cooperative cell which the serving BS 550 manages as a cooperative cell member BS, then the serving BS 550 performs a cooperative cell member BS update operation with the neighbor BS 2 570 in operation 528. If a radio front haul link has not been set up between the neighbor BS 1 560 and the neighbor BS 2 570, each of the neighbor BS 1 560 and the neighbor BS 2 570 respectively performs a radio front haul link set up operation in operations 530 and 532. The radio front haul link set up operations in operations 530, 532 are identical to the radio front haul link set up operations in operations 518 to 522, so a detailed description will be omitted herein.

Figure 6:
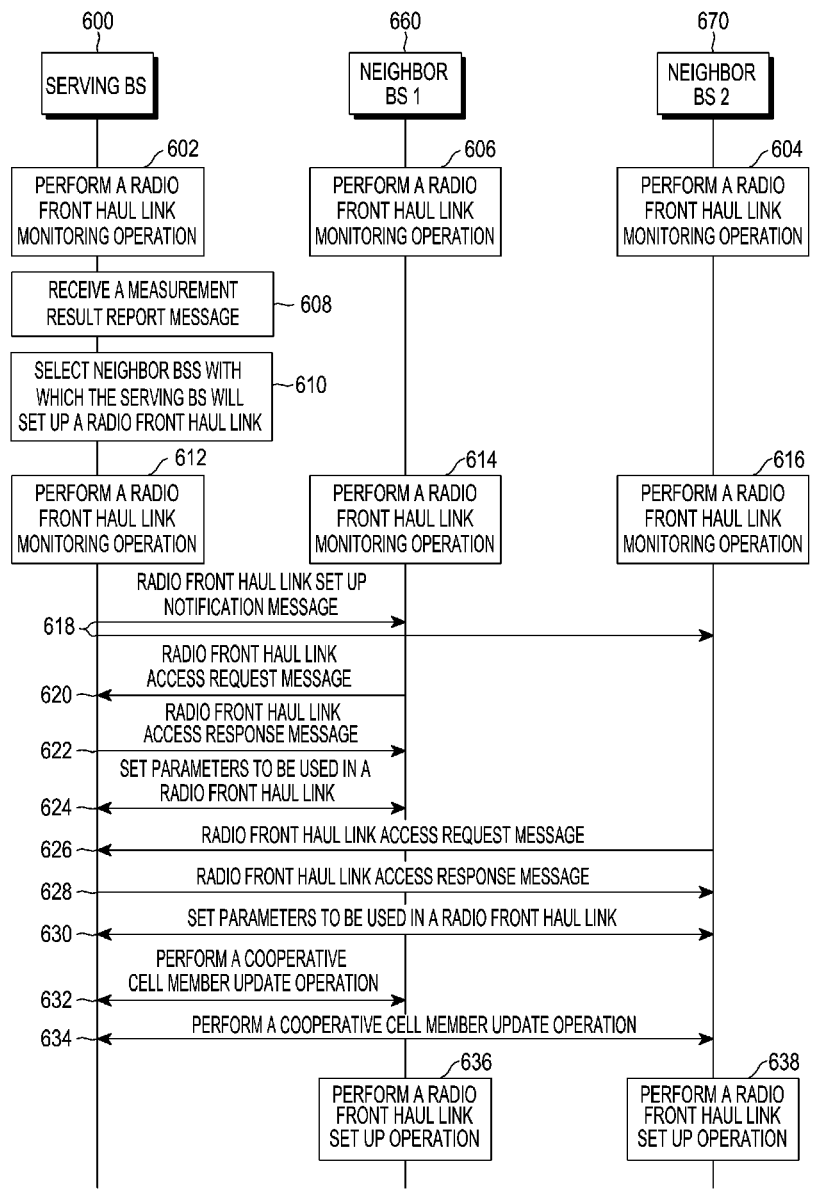
FIG. 6 schematically illustrates a process for setting up a radio front haul link in a cooperative communication system according to an embodiment of the present disclosure.

FIG. 6 schematically illustrates a process for setting up a radio front haul link in a cooperative communication system according to an embodiment of the present disclosure.

Referring to FIG. 6, for example, the cooperative communication system includes a serving BS 600, a neighbor BS 1 660, a neighbor BS 2 670, and an MS (not shown in FIG. 6).

The serving BS 600, the neighbor BS 1 660, and the neighbor BS 2 670 respectively perform a radio front haul link monitoring operation in operations 602, 604, and 606. The radio front haul link monitoring operations in operations 602, 604, and 606 are performed based on related radio front haul link monitoring window information, and each BS broadcasts a radio front haul link set up notification message, including information on neighbor BSs which will set up a radio front haul link with respective BSs, in a related radio front haul link monitoring window. The radio front haul link monitoring window information is acquired through a SON server on an initial deployment of the BSs or is acquired through message transmission and/or reception among the BSs, and includes information on a period, a start timing point and a length of the radio front haul link monitoring window. The period for the radio front haul link monitoring window may be determined by considering a transmission period of a measurement result report message for the MS.

If the radio front haul link monitoring operation in the serving BS 600 is performed in operation 602, then the neighbor BS 1 660 and the neighbor BS 2 670 acquire a synchronization with the serving BS 600, and monitor whether the serving BS 600 transmits a radio front haul link set up notification message. In operation 604, in which the radio front haul link monitoring operation in the neighbor BS 2 670 is performed, the serving BS 600 and the neighbor BS 1 660 monitor whether the radio front haul link set up notification message is transmitted from the neighbor BS 2 670.

If the serving BS 600 has already set up the radio front haul link with the neighbor BS 1 660, then the serving BS 600 does not perform the radio front haul link monitoring operation for the neighbor BS 1 660 in operation 602, and the neighbor BS 1 660 does not perform the radio front haul link monitoring operation for the serving BS 600 in operation 606. If the serving BS 600 has not already set up the radio front haul link with the neighbor BS 1 660, then each of the serving BS 600 and the neighbor BS 1 660 determines whether there is a need for performing a radio front haul link set up operation by monitoring whether a radio front haul link set up notification message is transmitted in the radio front haul link monitoring window.

The serving BS 600 receives a measurement result report message from the MS to which the serving BS 600 provides a service in operation 608. The serving BS 600 determines neighbor BSs with which the serving BS 600 will set up a radio front haul link based on a measurement result included in the received measurement result report message in operation 610. The serving BS 600 performs a radio front haul link monitoring operation in operation 612. Each of the neighbor BS 1 660 and the neighbor BS 2 670 respectively performs a radio front haul link monitoring prepare operation with the serving BS 600 in operations 614 and 616.

The serving BS 600 broadcasts a radio front haul link set up notification message on a radio front haul link monitoring window of the serving BS 600 in operation 618. The radio front haul link set up notification message includes BS information on neighbor BSs with which the serving BS 600 will set up a radio front haul link, and, in FIG. 6, it is assumed that BS information on the neighbor BS 2 670 is included in the radio front haul link set up notification message. Neighbor BSs which correspond to BS information included in the radio front haul link set up notification message, from among neighbor BSs which receive the radio front haul link set up notification message, such as the neighbor BS 1 660 and the neighbor BS 2 670, may transmit a radio front haul link set up confirm message as a response message to the radio front haul link set up notification message (not shown in FIG. 6). The radio front haul link set up confirm message includes information indicating that a related BS accepts or rejects the setting up of the radio front haul link with the serving BS 600, and may include a rejection reason if the information indicates that the related BS rejects the setting up of the radio front haul link with the serving BS 600, if needed. In FIG. 6, it is assumed that the neighbor BSs with which the serving BS 600 will set up the radio front haul link are the neighbor BS 1 660 and the neighbor BS 2 670.

The neighbor BS 1 660 transmits a radio front haul link access request message to the serving BS 600 in operation 620. After receiving the radio front haul link access request message from the neighbor BS 1 660, the serving BS 600 transmits a radio front haul link access response message, as a response message to the radio front haul link access request message, to the neighbor BS 1 660 in operation 622. Here, operations 620 and 622 correspond to an operation indicating a start of a radio front haul link set up operation and an operation in which a synchronization between the serving BS 600 and the neighbor BS 1 660 is acquired.

The serving BS 600 and the neighbor BS 1 660 set parameters to be used in the radio front haul link, such as radio front haul link ID information, security key information and connection ID information, in operation 624. The serving BS 600 performs the radio front haul link set up operation with the neighbor BS 2 670. A detailed description of the radio front haul link set up operation between the serving BS 600 and the neighbor BS 2 670 follows.

The neighbor BS 2 670 transmits a radio front haul link access request message to the serving BS 600 in operation 626. After receiving the radio front haul link access request message from the neighbor BS 2 670, the serving BS 600 transmits a radio front haul link access response message, as a response message to the radio front haul link access request message, to the neighbor BS 2 670 in operation 628. The serving BS 600 and the neighbor BS 2 670 set parameters to be used in a radio front haul link, such as a radio front haul link ID information, security key information and connection ID information, in operation 630. If the neighbor BS 1 660 and the neighbor BS 2 670 are included into a cooperative cell which the serving BS 600 manages as cooperative cell member BSs, then the serving BS 600 performs a cooperative cell member update operation with each of the neighbor BS 1 660 and the neighbor BS 2 670 in operations 632 and 634.

If the neighbor BS 1 660 and the neighbor BS 2 670 perform a radio front haul link set up operation with other cooperative cell member BSs included in the cooperative cell which the serving BS 600 manages, then the serving BS 600 may transmit a radio front haul link set up command message to the neighbor BS 1 660 and the neighbor BS 2 670 in operations 632 and 634. The radio front haul link set up command message includes BS information on the other neighbor BSs with which each of the neighbor BS 1 660 and the neighbor BS 2 670 will additionally set up a radio front haul link.

If the radio front haul link has not been set up between the neighbor BS 1 660 and the neighbor BS 2 670, then each of the neighbor BS 1 660 and the neighbor BS 2 670 respectively performs a radio front haul link set up operation in operations 636 and 638. In the radio front haul link set up operation in operations 636 and 638, an operation corresponding to the operations 620 to 630 is performed.

In FIG. 6, each BS separately operates a radio front haul link monitoring window in a radio front haul link set up process. On the other hand, BSs may operate a radio front haul link monitoring window by cooperating with each other, a detailed description of a radio front haul link set up operation for this case will be given with reference to FIGS. 7A and 7B.

Figure 7A:
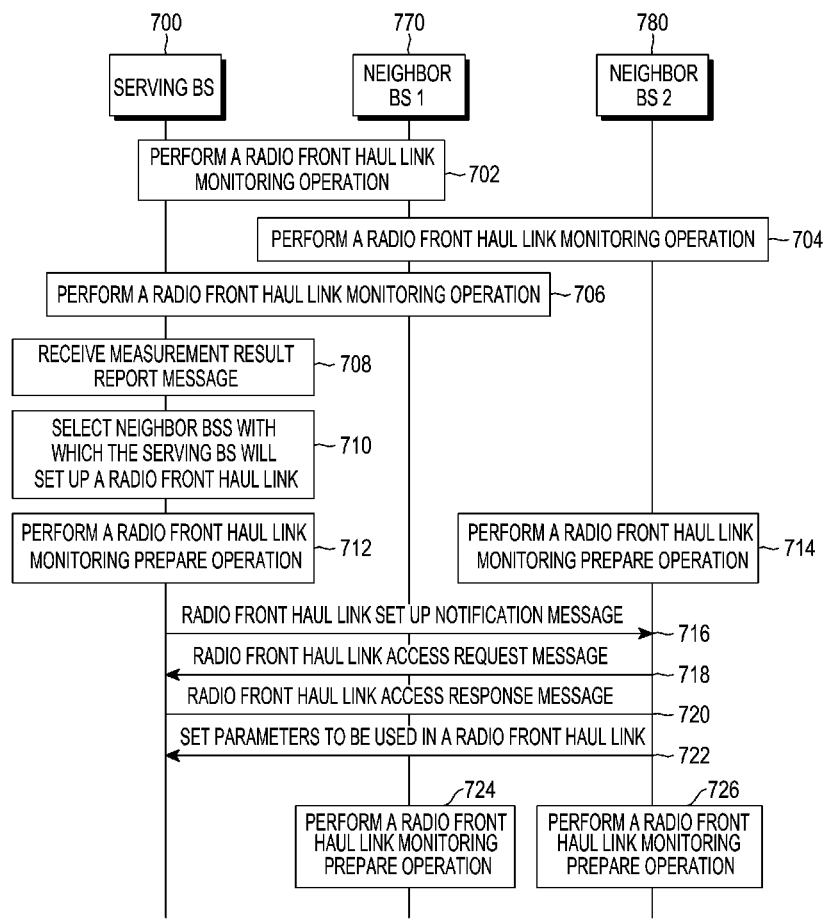
FIGS. 7A and 7B schematically illustrate a process for setting up a radio front haul link in a cooperative communication system according to an embodiment of the present disclosure.
Figure 7B:
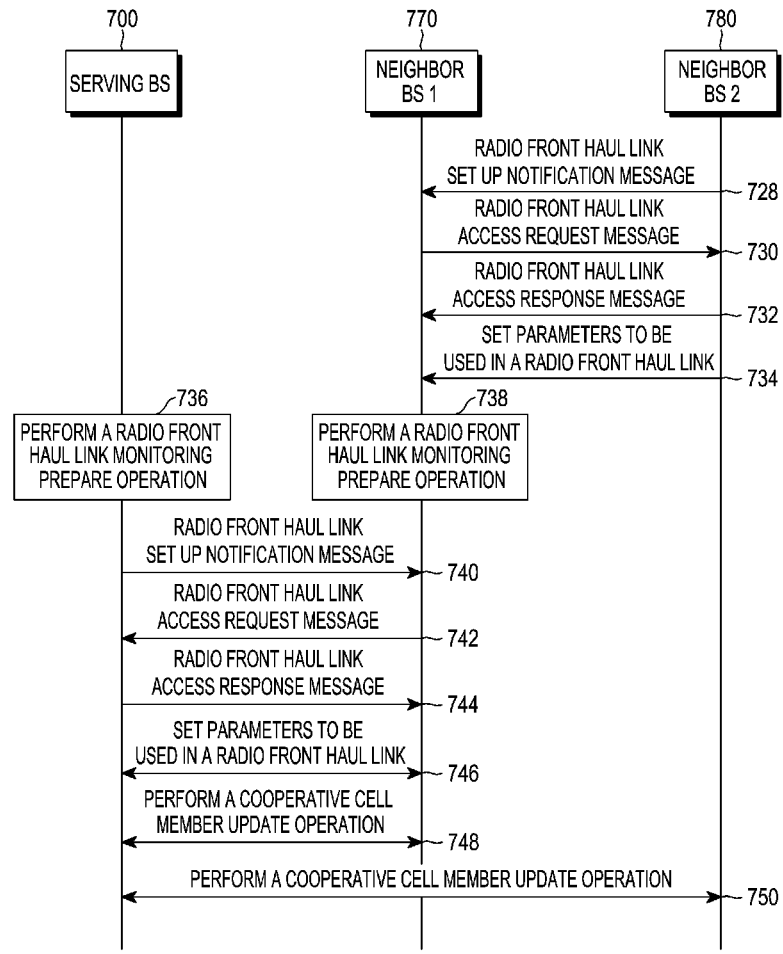

FIGS. 7A and 7B schematically illustrate a process for setting up a radio front haul link in a cooperative communication system according to an embodiment of the present disclosure.

Referring to FIGS. 7A and 7B, for example, the cooperative communication system includes a serving BS 700, a neighbor BS 1 770, a neighbor BS 2 780, and an MS (not shown in FIGS. 7A-7B).

The serving BS 700 and the neighbor BS 1 770 perform a radio front haul link monitoring operation in operation 702, the neighbor BS 1 770 and the neighbor BS 2 780 perform a radio front haul link monitoring operation in operation 704, and the serving BS 700 and the neighbor BS 2 780 perform a radio front haul link monitoring operation in operation 706. The radio front haul link monitoring operations in operations 702 to 706 are performed according to related radio front haul link monitoring window information.

The radio front haul link monitoring window information is acquired through a SON server on an initial deployment for the BSs 700, 770, and 780, or is acquired through message transmission and/or reception among the BSs, and includes, for example, information on a period, a start timing point and a length of the radio front haul link monitoring window. The period of the radio front haul link monitoring window may be determined by considering a transmission period of a measurement result report message for the MS.

The BSs transmit and/or receive a radio front haul link set up notification message from among the BSs upon performing the radio front haul link monitoring operation. In this case, for example, an order of BSs which transmit the radio front haul link set up notification message may be determined when the BSs are initially deployed.

The serving BS 700 receives a measurement result report message from the MS to which the serving BS 700 provides a service in operation 708. The serving BS 700 determines neighbor BSs with which the serving BS 700 will set up a radio front haul link based on a measurement result included in the measurement result report message in operation 710. In FIGS. 7A and 7B, it is assumed that the serving BS 700 determined that the neighbor BS 2 780 is the neighbor BS with which the serving BS 700 will set up the radio front haul link.

The serving BS 700 performs a prepare operation for performing the radio front haul link monitoring operation with the neighbor BS 2 780 in operation 712. The neighbor BS 2 780 performs a prepare operation for performing the radio front haul link monitoring operation with the serving BS 700 in operation 714. In the radio front haul link monitoring operation, it is assumed that the serving BS 700 first transmits a radio front haul link set up notification message in operation 716.

In FIGS. 7A and 7B, it is assumed that the serving BS 700 selects the neighbor BS 2 780 to be the neighbor BS which will set up a radio front haul link with the serving BS 700 in operation 710. So, the serving BS 700 notifies the neighbor BS 2 780 that the neighbor BS 2 780 will perform a radio front haul link set up operation with the serving BS 700 by transmitting a radio front haul link set up notification message to the neighbor BS 2 780. The radio front haul link set up notification message may include information on other neighbor BSs which will additionally set up a radio front haul link with the neighbor BS 2 780. The neighbor BS 2 780 may transmit a radio front haul link set up confirm message as a response message to the radio front haul link set up notification message (not shown in FIGS. 7A and 7B). The radio front haul link set up confirm message includes information indicating that a related BS accepts or rejects the setting up of a radio front haul link with the serving BS 700, and may include a rejection reason if the information indicates that the related BS rejects the setting up of the radio front haul link with the serving BS 700.

The neighbor BS 2 780 transmits a radio front haul link access request message to the serving BS 700 in operation 718. After receiving the radio front haul link access request message from the neighbor BS 2 780, the serving BS 700 transmits a radio front haul link access response message, as a response message to the radio front haul link access request message, to the neighbor BS 2 780 in operation 720. Here, operations 718 to 720 correspond to an operation indicating a start of a radio front haul link set up operation between the serving BS 700 and the neighbor BS 2 780 and an operation in which a synchronization between the serving BS 700 and the neighbor BS 2 780 is acquired. The serving BS 700 and the neighbor BS 2 780 set parameters to be used in a radio front haul link, such as a radio front haul link ID information, security key information and connection ID information in operation 722.

Each of the neighbor BS 1 770 and the neighbor BS 2 780 performs a prepare operation for performing a radio front haul link monitoring operation in operations 724 and 726. Here, the neighbor BS 1 770 and the neighbor BS 2 780 determine whether there is a need for setting up a radio front haul link between the neighbor BS 1 770 and the neighbor BS 2 780 in operations 724 and 726. In FIGS. 7A and 7B, it is assumed that BS information on the neighbor BS 1 770 is included in the radio front haul link set up notification message received in operation 716 and that the neighbor BS 2 780 first transmits a radio front haul link set up notification message. As shown in FIG. 7B, the neighbor BS 2 780 transmits the radio front haul link set up notification message to the neighbor BS 1 770 in operation 728. For example, the radio front haul link set up notification message transmitted in operation 728 may include an indicator indicating that there is a need for setting up a radio front haul link with the neighbor BS 2 780, and information on other neighbor BSs with which the neighbor BS 1 770 will additionally set up a radio front haul link.

The neighbor BS 1 770 may be informed that the neighbor BS 1 770 will set up the radio front haul link with the neighbor BS 2 780 according to the receiving of the radio front haul link set up notification message. The neighbor BS 1 770 may transmit a radio front haul link set up confirm message as a response message to the radio front haul link set up notification message (not shown in FIGS. 7A and 7B). The radio front haul link set up confirm message includes information indicating that a related BS accepts or rejects the setting up of a radio front haul link with the neighbor BS 2 780, and may include a rejection reason if the information indicates that the related BS rejects to set up the radio front haul link with the neighbor BS 2 780.

After receiving the radio front haul link set up notification message, the neighbor BS 1 770 transmits a radio front haul link access request message to the neighbor BS 2 780 in operation 730. After receiving the radio front haul link access request message from the neighbor BS 1 770, the neighbor BS 2 780 transmits a radio front haul link access response message, as a response message to the radio front haul link access request message, to the neighbor BS 1 770 in operation 732. The neighbor BS 1 770 and the neighbor BS 2 780 set parameters to be used in the radio front haul link, such as radio front haul link ID information, security key information and connection ID information in operation 734.

Each of the serving BS 700 and the neighbor BS 1 770 performs a prepare operation for performing a radio front haul link monitoring operation in operations 736 and 738. If the serving BS 700 first transmits a radio front haul link set up notification message upon performing the radio front haul link monitoring operation, then the serving BS 700 transmits a radio front haul link set up notification message to the neighbor BS 1 770 in operation 740. The radio front haul link set up notification message transmitted in operation 740 includes an indicator indicating that there is a need for setting up a radio front haul link with the serving BS 700 and includes BS information on other neighbor BSs with which the neighbor BS 1 770 will additionally set up a radio front haul link.

After receiving the radio front haul link set up notification message from the serving BS 700, the neighbor BS 1 770 may transmit a response message to the radio front haul link set up notification message (not shown in FIGS. 7A and 7B). The response message to the radio front haul link set up notification message includes information indicating that a related BS accepts or rejects the setting up of the radio front haul link with the serving BS 700, and may include a rejection reason if the information indicates that the related BS rejects to set up the radio front haul link with the serving BS 700.

After receiving the radio front haul link set up notification message from the serving BS 700, the neighbor BS 1 770 transmits a radio front haul link access request message to the serving BS 700 in operation 742. After receiving the radio front haul link access request message from the neighbor BS 1 770, the serving BS 700 transmits a radio front haul link access response message, as a response message to the radio front haul link access request message, to the neighbor BS 1 770 in operation 744. The serving BS 700 and the neighbor BS 1 770 set parameters to be used in the radio front haul link, such as radio front haul link ID information, security key information and connection ID information in operation 746.

If the neighbor BS 1 770 and the neighbor BS 2 780 are included in a cooperative cell, which the serving BS 700 manages, as cooperative cell member BSs, then the serving BS 700 performs a cooperative cell member update operation with the neighbor BS 1 770 and the neighbor BS 2 780 in operations 748 and 750.

Figure 8:
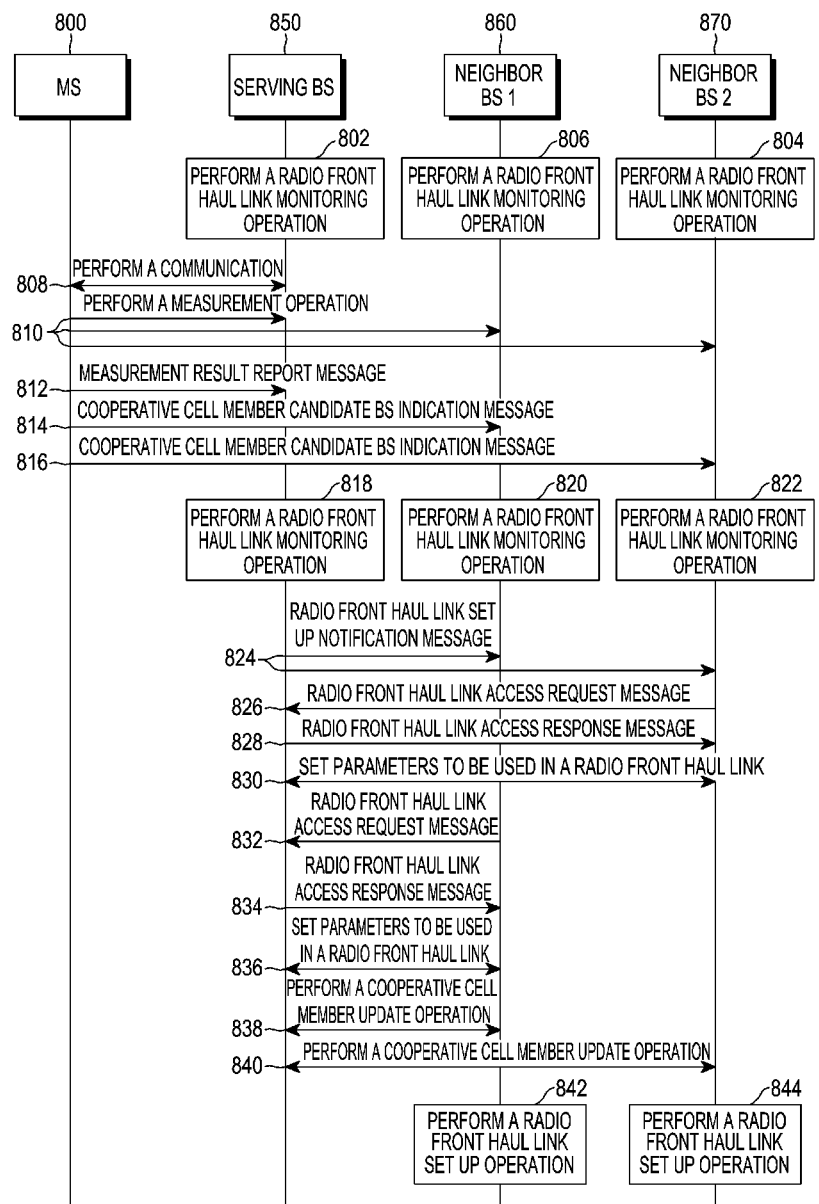
FIG. 8 schematically illustrates a process for setting up a radio front haul link in a cooperative communication system according to an embodiment of the present disclosure.

FIG. 8 schematically illustrates a process for setting up a radio front haul link in a cooperative communication system according to an embodiment of the present disclosure.

Referring to FIG. 8, for example, the cooperative communication system includes an MS 800, a serving BS 850, a neighbor BS 1 860, and a neighbor BS 2 870.

The serving BS 800, the neighbor BS 1 860, and the neighbor BS 2 870 perform a radio front haul link monitoring operation in operations 802, 804, and 806. The radio front haul link monitoring operations in operations 802, 804, and 806 are performed based on related radio front haul link monitoring window information. The radio front haul link monitoring window information is acquired through a SON server on an initial deployment for the BSs 800, 850, 860, and 870 or are acquired through message transmission and/or reception among the BSs 800, 850, 860, and 870, and includes information on a period, a start timing point and a length of the radio front haul link monitoring window. The period for the radio front haul link monitoring window may be determined by considering a transmission period of a measurement result report message for the MS 800.

While the MS 800 receives a communication service from the serving BS 850 in operation 808, the MS 800 performs a measurement operation for the serving BS 850 and neighbor BSs in operation 810 and transmits a measurement result report message to the serving BS 850 in order to report a measurement result, according to the performing of the measurement operation, in operation 812. The measurement result report message includes BS information on neighbor BSs which may provide a service to the MS 800 by cooperating with the serving BS 850 and a measurement result for neighbor BSs. In FIG. 8, it is assumed that the neighbor BSs which may provide the service to the MS 800 by cooperating with the serving BS 850 are the neighbor BS 1 860 and the neighbor BS 2 870.

After receiving the measurement result report message, the serving BS 850 determines whether there is a need for setting up a radio front haul link with the neighbor BS 1 860 and the neighbor BS 2 870 (not shown in FIG. 8). The MS 800 respectively transmits a cooperative cell member candidate BS indication message, indicating that a related BS is a cooperative cell member candidate BS and will set up a radio front haul link with the serving BS 850, to both the neighbor BS 1 860 and the neighbor BS 2 870 in operations 814 and 816. For example, the cooperative cell member candidate BS indication message may be implemented in form of a message including MS ID information of the MS 800 and BS ID information of the serving BS 850, or a scrambling code, or any other similar and/or suitable form or format.

After receiving the cooperative cell member candidate BS indication message, each of the neighbor BS 1 860 and the neighbor BS 2 870 determines whether a radio front haul link has been already set up with the serving BS 850 or wherein there is a need for setting up the radio front haul link with the serving BS 850 (not shown in FIG. 8).

The serving BS 850 performs a radio front haul link monitoring prepare operation in operation 818. Each of the neighbor BS 1 860 and the neighbor BS 2 870 respectively performs a radio front haul link monitoring prepare operation with the serving BS 850 in operations 820 and 822. The serving BS 850 broadcasts a radio front haul link set up notification message according to the performing of the radio front haul link monitoring operation in operation 824. The radio front haul link set up notification message includes BS information on neighbor BSs with which the serving BS 850 will set up a radio front haul link. In FIG. 8, it is assumed that the neighbor BSs with which the serving BS 850 will set up the radio front haul link are the neighbor BS 1 860 and the neighbor BS 2 870.

Each of the neighbor BS 1 860 and the neighbor BS 2 870 may transmit a radio front haul link set up confirm message, as a response message to the radio front haul link set up notification message, to the serving BS 850 (not shown in FIG. 8). The radio front haul link set up confirm message includes information indicating that a related BS accepts or rejects the setting up of a radio front haul link with the serving BS 850, and may include a rejection reason if the information indicates that the related BS rejects to set up the radio front haul link with the serving BS 850.

After receiving the radio front haul link setup notification message, the neighbor BS 1 860 and the neighbor BS 2 870 perform a radio front haul link setup operation with the serving BS 850.

The neighbor BS 1 860 transmits a radio front haul link access request message to the serving BS 850 in operation 826. After receiving the radio front haul link access request message, the serving BS 850 transmits a radio front haul link access response message, as a response message to the radio front haul link access request message, to the neighbor BS 1 860 in operation 828. Here, operations 826 and 828 correspond to an operation indicating a start of a radio front haul link set up operation and an operation in which a synchronization between the serving BS 850 and the neighbor BS 1 860 is acquired.

The serving BS 850 and the neighbor BS 1 860 set parameters to be used in the radio front haul link, such as radio front haul link ID information, security key information and connection ID information in operation 830. The neighbor BS 2 870 transmits a radio front haul link access request message to the serving BS 850 in operation 832. After receiving the radio front haul link access request message from the neighbor BS 2 870, the serving BS 850 transmits a radio front haul link access response message, as a response message to the radio front haul link access request message, to the neighbor BS 2 870 in operation 834. The serving BS 850 and the neighbor BS 2 870 set parameters to be used in the radio front haul link, such as radio front haul link ID information, security key information and connection ID information in operation 836.

If the neighbor BS 1 860 and the neighbor BS 2 870 are included in a cooperative cell, which the serving BS 850 manages, as cooperative cell member BSs, then the serving BS 850 performs a cooperative cell member update operation with the neighbor BS 1 860 and the neighbor BS 2 870 in operations 838 and 840. If neighbor BS 1 860 and the neighbor BS 2 870 are to perform a radio front haul link set up operation with other cooperative cell member BS which the serving BS 850 manages, then, although not shown, the serving BS 850 additionally transmits a radio front haul link set up command message to the neighbor BS 1 860 in operation 838. Also, although not shown, the serving BS 850 transmits a radio front haul link set up command message to the neighbor BS 2 870 in operation 840. The radio front haul link set up command message includes BS information on neighbor BSs with which the neighbor BS 1 860 and the neighbor BS 2 870 will additionally set up a radio front haul link.

The neighbor BS 1 860 and the neighbor BS 2 870 perform a radio front haul link set up operation in operations 842 and 844. In the radio front haul link set up operations in operations 842 and 844, the operations in operations 826 to 836 may be performed.

Figure 9A:
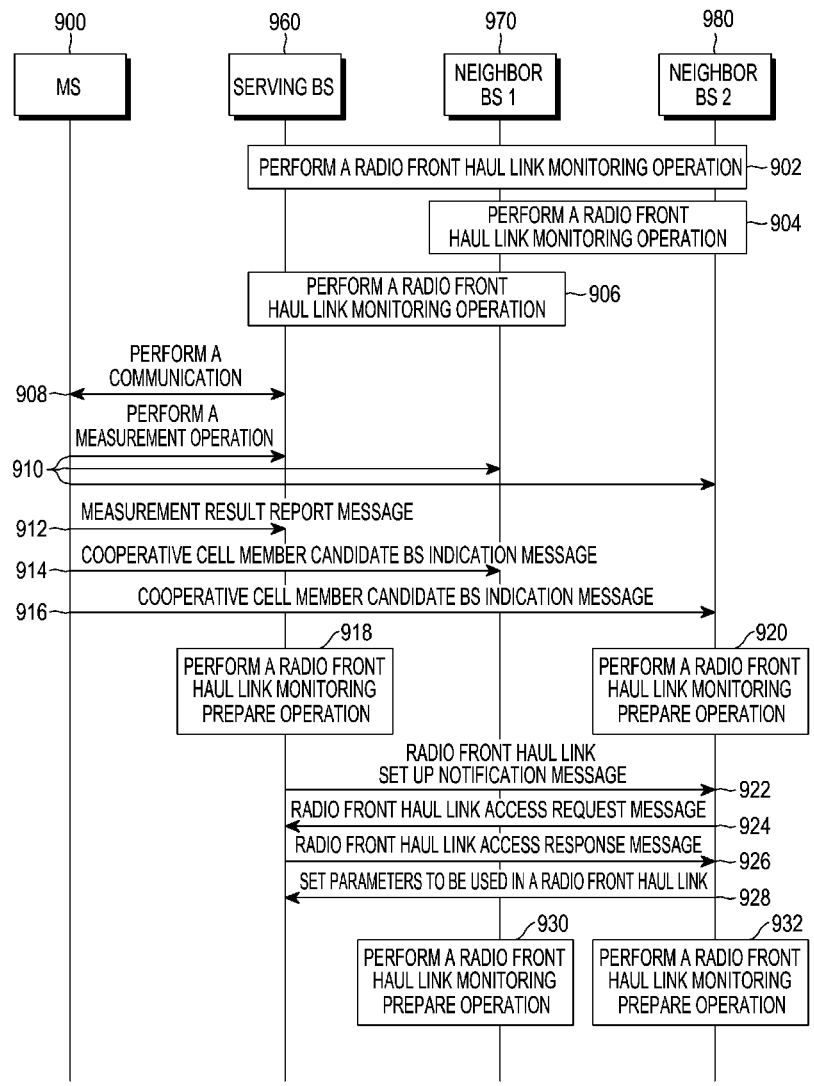
FIGS. 9A and 9B schematically illustrate a process for setting up a radio front haul link in a cooperative communication system according to an embodiment of the present disclosure.
Figure 9B:
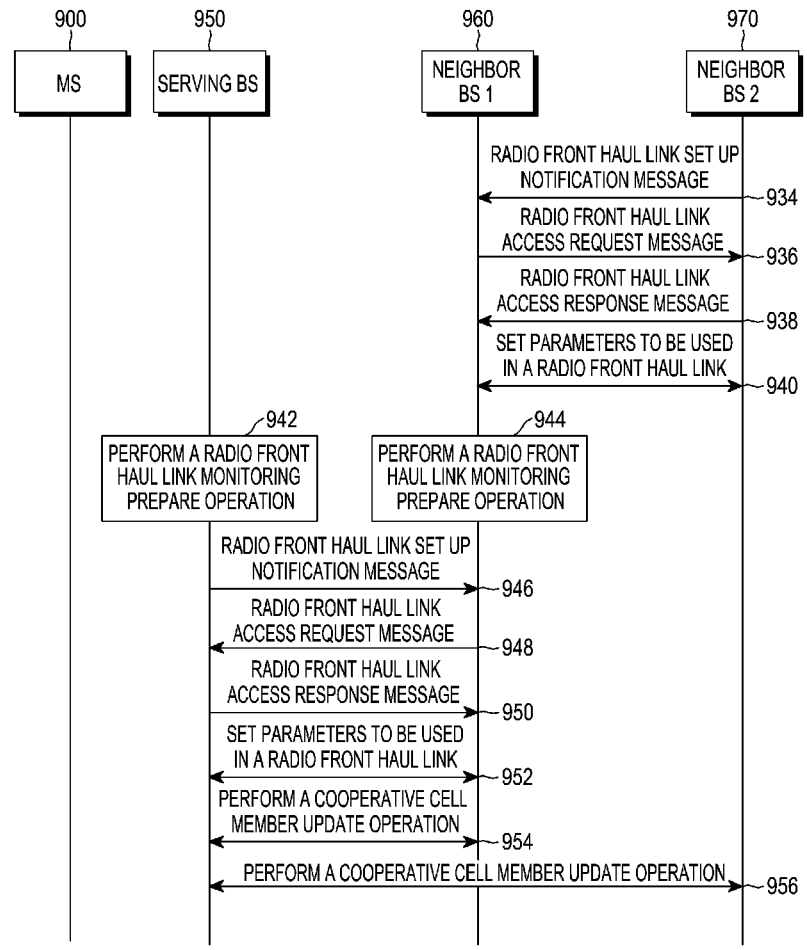

FIGS. 9A and 9B schematically illustrate a process for setting up a radio front haul link in a cooperative communication system according to an embodiment of the present disclosure.

Referring to FIGS. 9A and 9B, for example, the cooperative communication system includes an MS 900, a serving BS 960, a neighbor BS 1 970, and a neighbor BS 2 980.

The serving BS 960 and the neighbor BS 2 980 perform a radio front haul link monitoring operation in operation 902, the neighbor BS 1 970 and the neighbor BS 2 980 perform a radio front haul link monitoring operation in operation 904, and the serving BS 960 and neighbor BS 1 970 perform a radio front haul link monitoring operation in operation 906.

While the MS 900 receives a communication service from the serving BS 960 in operation 908, the MS 900 performs a measurement operation for the serving BS 960 and neighbor BSs in operation 910 and transmits a measurement result report message to the serving BS 960 in order to report a measurement result according to performing the measurement operation in operation 912. The measurement result report message includes BS information on neighbor BSs which may provide a service to the MS 900 by cooperating with the serving BS 960 and a measurement result for neighbor BSs. In FIGS. 9A and 9B, it is assumed that the neighbor BSs, which may provide the service to the MS 900 by cooperating with the serving BS 960, are the neighbor BS 1 970 and the neighbor BS 2 980. After receiving the measurement result report message, the serving BS 960 determines whether there is a need for setting up a radio front haul link with the neighbor BS 1 970 and the neighbor BS 2 980 (not shown in FIGS. 9A and 9B).

The MS 900 transmits a cooperative cell member candidate BS indication message indicating that a related BS is a cooperative cell member candidate BS and that it will set up a radio front haul link with the serving BS 960 to the neighbor BS 1 970 and the neighbor BS 2 980 in operations 914 and 916. For example, the cooperative cell member candidate BS indication message may be implemented in form of a message including MS ID information of the MS 900 and BS ID information of the serving BS 960, or a scrambling code, or may be implemented in any suitable form or format.

After receiving the cooperative cell member candidate BS indication message, each of the neighbor BS 1 970 and the neighbor BS 2 980 determines whether a radio front haul link has been already set up with the serving BS 960 or whether there is a need for setting up the radio front haul link with the serving BS 960 (not shown in FIG. 9).

The serving BS 960 performs a radio front haul link monitoring prepare operation with the neighbor BS 2 980 in operation 918. The neighbor BS 2 980 performs a radio front haul link monitoring prepare operation with the serving BS 960 in operation 920.

If the serving BS 960 determines that the serving BS 960 will set up a radio front haul link with the neighbor BS 2 980, based on a measurement result included in the measurement result report message received from the MS 900, then the serving BS 960 notifies the neighbor BS 2 980 that the neighbor BS 2 980 will perform a radio front haul link set up operation with the serving BS 960 by transmitting a radio front haul link set up notification message to the neighbor BS 2 980 in operation 922. The radio front haul link set up notification message includes BS information on neighbor BSs with which the neighbor BS 2 980 will additionally set up a radio front haul link. In FIGS. 9A and 9B, it is assumed that the neighbor BS with which the neighbor BS 2 980 will additionally set up the radio front haul link is the neighbor BS 1 970.

The neighbor BS 2 980 may transmit a radio front haul link set up confirm message, as a response message to the radio front haul link set up notification message, to the serving BS 960 (not shown in FIGS. 9A and 9B). The radio front haul link set up confirm message includes information indicating that a related BS accepts or rejects the setting up of a radio front haul link with the serving BS 960, and may include a rejection reason if the information indicates that the related BS rejects to set up the radio front haul link with the serving BS 960.

The neighbor BS 2 980 transmits a radio front haul link access request message to the serving BS 960 in operation 924. After receiving the radio front haul link access request message from the neighbor BS 2 980, the serving BS 960 transmits a radio front haul link access response message, as a response message to the radio front haul link access request message, to the neighbor BS 2 980 in operation 926. Here, operations 924 and 926 correspond to an operation indicating a start of a radio front haul link set up operation and an operation in which a synchronization between the serving BS 960 and the neighbor BS 2 980 is acquired. The serving BS 960 and the neighbor BS 2 980 set parameters to be used in the radio front haul link, such as radio front haul link ID information, security key information and connection ID information in operation 928.

The neighbor BS 1 970 and the neighbor BS 2 980 perform a radio front haul link monitoring prepare operation in operations 930 and 932. In operations 930 and 932, each of the neighbor BS 1 970 and the neighbor BS 2 980 determines whether there is a need for setting up a radio front haul link between the neighbor BS 1 970 and the neighbor BS 2 980. In FIGS. 9A and 9B, it is assumed that the neighbor BS 2 980 first transmits a radio front haul link set up notification message. The neighbor BS 2 980 transmits the radio front haul link set up notification message to the neighbor BS 1 970 in operation 934, as shown in FIG. 9B. The radio front haul link set up notification message includes an indicator indicating that the neighbor BS 1 970 will set up a radio front haul link with the neighbor BS 2 980 and information on other neighbor BSs with which the neighbor BS 1 970 will additionally set up a radio front haul link. The neighbor BS 1 970 may transmit a radio front haul link set up confirm message, as a response message to the radio front haul link set up notification message, to the neighbor BS 2 980 (not shown in FIGS. 9A and 9B). The radio front haul link set up confirm message includes information indicating that the neighbor BS 1 970 accepts or rejects the setting up of a radio front haul link with the neighbor BS 2 980, and may include a rejection reason if the information indicates that the neighbor BS 1 970 rejects the setting up of the radio front haul link with the neighbor BS 2 980. The neighbor BS 1 970 transmits a radio front haul link access request message to the neighbor BS 2 980 in operation 936. After receiving the radio front haul link access request message from the neighbor BS 1 970, the neighbor BS 2 980 transmits a radio front haul link access response message, as a response message to the radio front haul link access request message, to the neighbor BS 1 970 in operation 938. The neighbor BS 1 970 and the neighbor BS 2 980 set parameters to be used in the radio front haul link, such as radio front haul link ID information, security key information and connection ID information in operation 940.

The serving BS 960 and the neighbor BS 1 970 perform a radio front haul link monitoring prepare operation is operations 942 and 944. If the serving BS 960 first transmits a radio front haul link set up notification message upon performing the radio front haul link monitoring prepare operation, then the serving BS 960 transmits the radio front haul link set up notification message to the neighbor BS 1 970 in operation 946. The radio front haul link set up notification message includes an indicator indicating that the neighbor BS 1 970 will set up a radio front haul link with the serving BS 960 and includes information on other neighbor BSs with which the neighbor BS 1 970 will additionally set up a radio front haul link. The neighbor BS 1 970 may transmit a radio front haul link set up confirm message as a response message to the radio front haul link set up notification message to the serving BS 960 (not shown in FIGS. 9A and 9B). The radio front haul link set up confirm message includes information indicating that the neighbor BS 1 970 accepts or rejects the setting up of a radio front haul link with the serving BS 960, and may include a rejection reason if the information indicates that the neighbor BS 1 970 rejects to set up the radio front haul link with the serving BS 960.

The neighbor BS 1 970 transmits a radio front haul link access request message to the serving BS 960 in operation 948. After receiving the radio front haul link access request message from the neighbor BS 1 970, the serving BS 960 transmits a radio front haul link access response message, as a response message to the radio front haul link access request message, to the neighbor BS 1 970 in operation 950. The serving BS 960 and the neighbor BS 1 970 set parameters to be used in a radio front haul link, such as radio front haul link ID information, security key information and connection ID information in operation 952.

If the neighbor BS 1 970 and the neighbor BS 2 980 are included in a cooperative cell, which the serving BS 960 manages, as a cooperative cell member BS, then the serving BS 960 performs a cooperative cell member update operation with each of the neighbor BS 1 970 and the neighbor BS 2 980 in operations 954 and 956.

As described in FIGS. 6 to 9B, if a radio front haul link monitoring operation is periodically performed, it may be considered that a message indicating that there is a need for adjusting a period for the radio front haul link monitoring operation, instead of a radio front haul link set up notification message, is transmitted among BSs. In this case, it is unnecessary to set up radio front haul links among the BSs, however a transmission period for the radio front haul link set up notification message may be reduced, thereby dynamically performing a radio front haul link set up among the BSs by reflecting a change status for a measurement result of an MS.

Figure 10:
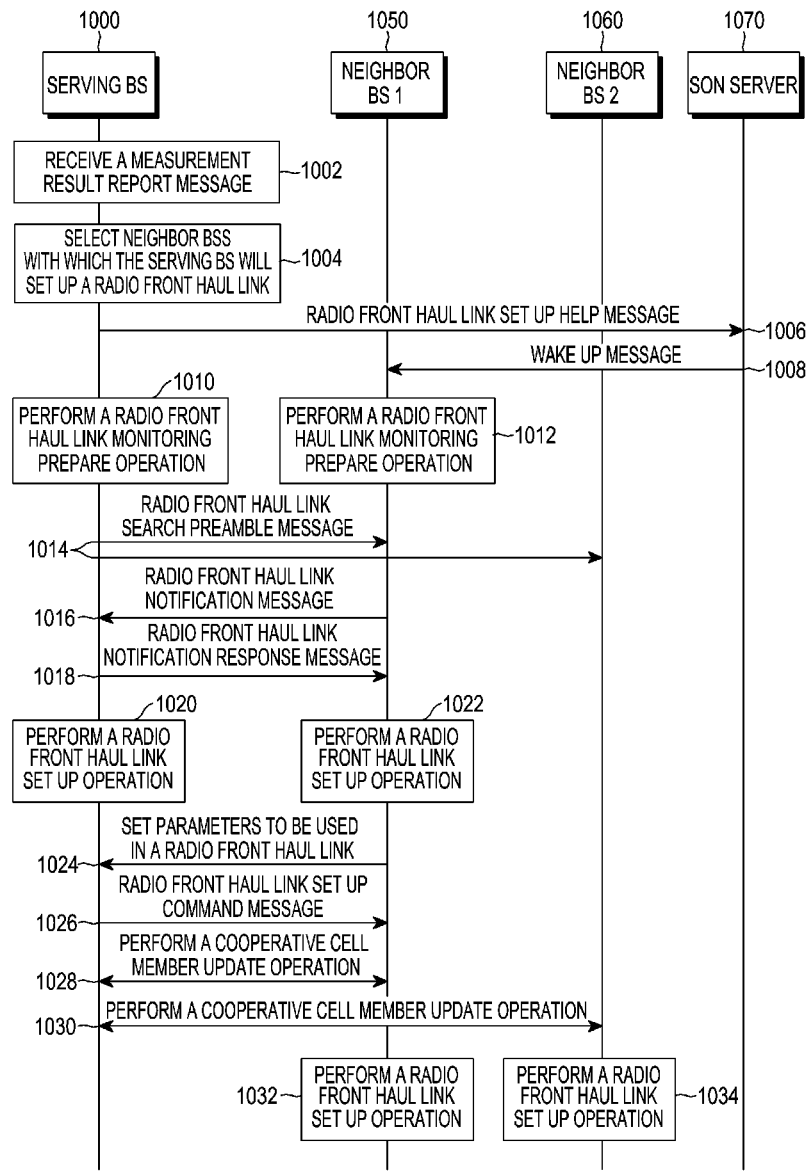
FIG. 10 schematically illustrates a process for setting up a radio front haul link in a cooperative communication system according to an embodiment of the present disclosure.

FIG. 10 schematically illustrates a process for setting up a radio front haul link in a cooperative communication system according to an embodiment of the present disclosure.

Referring to FIG. 10, for example, the cooperative communication system includes a serving BS 1000, a neighbor BS 1 1050, a neighbor BS 2 1060, a SON server 1070, and an MS (not shown in FIG. 10).

Referring to FIG. 10, the serving BS 1000 receives a measurement report message from the MS in operation 1002. The serving BS 1000 selects neighbor BSs with which the serving BS 1000 will set up a radio front haul link according to a measurement result included in the measurement report message in operation 1004. The serving BS 1000 requests the neighbor BSs selected in operation 1004 to transmit a wake up message indicating that there is a need for setting up a radio front haul link by transmitting a radio front haul link set up help message to the SON server 1070 in operation 1006. The radio front haul link set up help message includes BS ID information on a BS which requests the setting up of the radio front haul link, i.e., the serving BS 1000, BS ID information on a neighbor BS which requires a radio front haul link set up, and radio front haul link monitoring window information, such as a start timing point information and length information for a radio front haul link monitoring window. In FIG. 10, it is assumed that the neighbor BS which requires the radio front haul link set up is the neighbor BS 1 1050.

After receiving the radio front haul link set up help message, the SON server 1070 transmits a wake up message, indicating that the neighbor BS 1 1050 will set up a radio front haul link with the serving BS 1000, to the neighbor BS 1 1050 in operation 1008. After receiving the wake up message, the neighbor BS 1 1050 performs a radio front haul link monitoring prepare operation for the serving BS 1000 according to the radio front haul link monitoring window information included in the wake up message in operation 1012.

The serving BS 1000 performs a radio front haul link monitoring prepare operation in operation 1010.

The serving BS 1000 broadcasts a radio front haul link search preamble message in operation 1014. The radio front haul link search preamble message includes BS ID information on the serving BS 1000, and is used as a reference signal to neighbor BSs with which the serving BS 1000 will perform an initial radio front haul link set up operation or perform an radio front haul link re-set up operation.

After receiving the radio front haul link search preamble message from the serving BS 1000, the neighbor BS 1 1050 transmits a radio front haul link set up notification message to the serving BS 1000 in operation 1016. The radio front haul link set up notification message may be implemented in a message including BS ID information of the neighbor BS 1 1050 or a code which is scrambled with the BS ID information of the neighbor BS 1 1050. After receiving the radio front haul link set up notification message from the neighbor BS 1 1050, the serving BS 1000 transmits a radio front haul link set up notification response message, as a response message to the radio front haul link set up notification message, to the neighbor BS 1 1050 in operation 1018.

The serving BS 1000 and the neighbor BS 1 1050 perform a radio front haul link set up operation in operations 1020 and 1022. The serving BS 1000 and the neighbor BS 1 1050 acquire link synchronization, and set parameters to be used in the radio front haul link, such as radio front haul link ID information, security key information and connection ID information in operation 1024.

If the neighbor BS 1 1050 is to perform a radio front haul link set up operation with other neighbor BSs, which the serving BS 1000 manages, then the serving BS 1000 transmits a radio front haul link set up command message to the neighbor BS 1 1050 in operation 1026. The radio front haul link set up command message includes BS information on other neighbor BSs with which the serving BS 1000 will set up a radio front haul link. If the neighbor BS 1 1050 is included in a cooperative cell, which the serving BS 1000 manages, as a cooperative cell member BS, then the serving BS 1000 performs a cooperative cell member update operation with the neighbor BS 1 1050 in operation 1028.

If the neighbor BS 2 1060 is included into the cooperative cell, which the serving BS 1000 manages, as a cooperative cell member BS, then the serving BS 1000 performs a cooperative cell member update operation with the neighbor BS 2 1060 in operation 1030. During the cooperative cell member update operation of operation 1030, the serving BS 1000 may transmit a radio front haul link command message, indicating that the neighbor BS 2 1060 will perform a radio front haul link set up operation with the neighbor BS 1 1050, which is included in the cooperative cell as the cooperative cell member BS, to the neighbor BS 2 1060 in operation 1030. Each of the neighbor BS 1 1050 and the neighbor BS 2 1060 performs a radio front haul link set up operation in operations 1032 and 1034. In the operations in operations 1032 and 1034, the operations in operations 1014 to 1024 may be performed.

Figure 11:
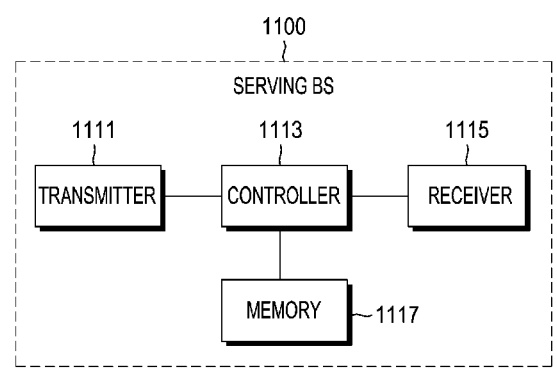
FIG. 11 schematically illustrates an internal structure of a serving Base Station (BS) in a cooperative communication system according to an embodiment of the present disclosure.

FIG. 11 schematically illustrates an internal structure of a serving BS in a cooperative communication system according to an embodiment of the present disclosure.

Referring to FIG. 11, a serving BS 1100 includes a transmitter 1111, a controller 1113, a receiver 1115, and a memory 1117.

The controller 1113 controls the overall operation of the serving BS 1100. In particular, the controller 1113 controls the serving BS 1100 to perform operations corresponding to a method for setting up a radio front haul link. The operations corresponding to the method for setting up the radio front haul link are performed in the manner described before with reference to FIGS. 2 to 10, so a detailed description thereof will be omitted herein.

The transmitter 1111 transmits signal and messages to a SON server, neighbor BSs and MSs under a control of the controller 1113. The receiver 1115 receives signal and messages from the SON server, the neighbor BSs and the MSs under a control of the controller 1113. The memory 1117 stores programs and data related to the operations corresponding to the method for setting up the radio front haul link in the serving BS 1100 in FIGS. 2 to 10.

While the transmitter 1111, the controller 1113, the receiver 1115, and the memory 1117 are shown in FIG. 11 as separate units, it is to be understood that this is for merely convenience of description. In other words, two or more of the transmitter 1111, the controller 1113, the receiver 1115, and the memory 1117 may be incorporated into a single unit.

Figure 12:
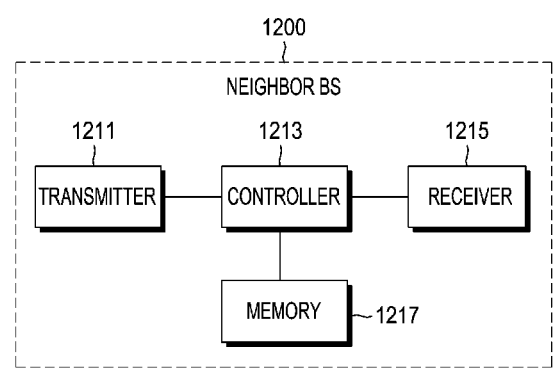
FIG. 12 schematically illustrates an internal structure of a neighbor BS in a cooperative communication system according to an embodiment of the present disclosure.

FIG. 12 schematically illustrates an internal structure of a neighbor BS in a cooperative communication system according to an embodiment of the present disclosure.

Referring to FIG. 12, a neighbor BS 1200 includes a transmitter 1211, a controller 1213, a receiver 1215, and a memory 1217.

The controller 1213 controls the overall operation of the neighbor BS 1200. In particular, the controller 1213 controls the neighbor BS 1200 to perform operations corresponding to a method for setting up a radio front haul link. The operations corresponding to the method for setting up the radio front haul link are performed in the manner described before with reference to FIGS. 2 to 10, so a detailed description thereof will be omitted herein.

The transmitter 1211 transmits signal and messages to a SON server, a serving BS and MSs under a control of the controller 1213. The receiver 1215 receives signal and messages from the SON server, the serving BS and the MSs under a control of the controller 1213. The memory 1217 stores programs and data related to the operations corresponding to the method for setting up the radio front haul link in the neighbor BS 1200 in FIGS. 2 to 10.

While the transmitter 1211, the controller 1213, the receiver 1215, and the memory 1217 are shown in FIG. 12 as separate units, it is to be understood that this is for merely convenience of description. In other words, two or more of the transmitter 1211, the controller 1213, the receiver 1215, and the memory 1217 may be incorporated into a single unit.

Figure 13:
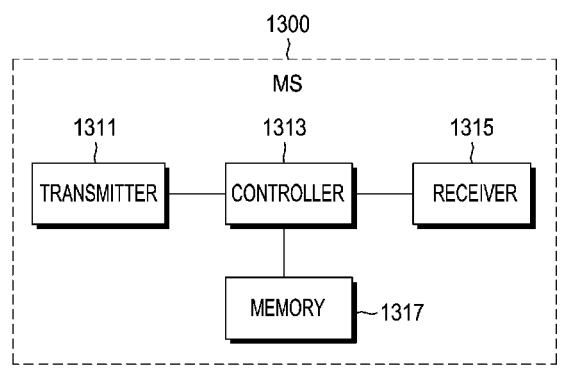
FIG. 13 schematically illustrates an internal structure of a Mobile Station (MS) in a cooperative communication system according to an embodiment of the present disclosure.

FIG. 13 schematically illustrates an internal structure of an MS in a cooperative communication system according to an embodiment of the present disclosure.

Referring to FIG. 13, an MS 1300 includes a transmitter 1311, a controller 1313, a receiver 1315, and a memory 1317.

The controller 1313 controls the overall operation of the MS 1300. In particular, the controller 1313 controls the MS 1300 to perform operations corresponding to a method for setting up a radio front haul link. The operations corresponding to the method for setting up the radio front haul link are performed in the manner described before with reference to FIGS. 2 to 10, so a detailed description thereof will be omitted herein.

The transmitter 1311 transmits signal and messages to a serving BS and neighbor BSs under a control of the controller 1313. The receiver 1315 receives signal and messages from the serving BS and the neighbor BSs under a control of the controller 1313. The memory 1317 stores programs and data related to the operations corresponding to the method for setting up the radio front haul link in the MS 1300 in FIGS. 2 to 10.

While the transmitter 1311, the controller 1313, the receiver 1315, and the memory 1317 are shown in FIG. 13 as separate units, it is to be understood that this is for merely convenience of description. In other words, two or more of the transmitter 1311, the controller 1313, the receiver 1315, and the memory 1317 may be incorporated into a single unit.

Figure 14:
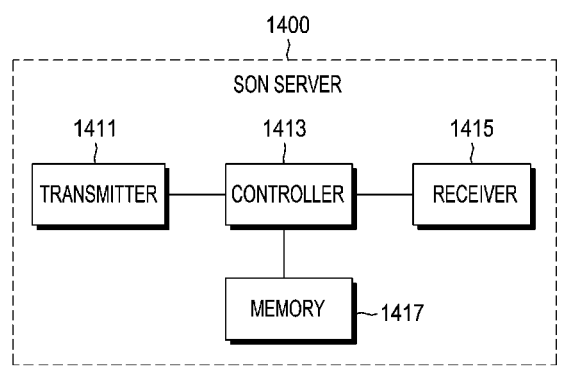
FIG. 14 schematically illustrates an internal structure of a Self Organizing Network (SON) server in a cooperative communication system according to an embodiment of the present disclosure.

FIG. 14 schematically illustrates an internal structure of a SON server in a cooperative communication system according to an embodiment of the present disclosure.

Referring to FIG. 14, a SON server 1400 includes a transmitter 1411, a controller 1413, a receiver 1415, and a memory 1417.

The controller 1413 controls the overall operation of the SON server 1400. In particular, the controller 1413 controls the SON server 1400 to perform operations corresponding to a method for setting up a radio front haul link. The operations corresponding to the method for setting up the radio front haul link are performed in the manner described before with reference to FIGS. 2 to 10, so a detailed description thereof will be omitted herein.

The transmitter 1411 transmits signal and messages to a serving BS and neighbor BSs under a control of the controller 1413. The receiver 1415 receives signal and messages from the serving BS and the neighbor BSs under a control of the controller 1413. The memory 1417 stores programs and data related to the operations corresponding to the method for setting up the radio front haul link in the SON server 1400 in FIGS. 2 to 10.

While the transmitter 1411, the controller 1413, the receiver 1415, and the memory 1417 are shown in FIG. 14 as separate units, it is to be understood that this is for merely convenience of description. In other words, two or more of the transmitter 1411, the controller 1413, the receiver 1415, and the memory 1417 may be incorporated into a single unit.

As is apparent from the foregoing description, the present disclosure enables the setting up of a radio front haul link in a cooperative communication system.

The present disclosure enables the setting up of a radio front haul link in a cooperative communication system thereby minimizing a hardware requirement.

The present disclosure enables the setting up of a radio front haul link in a cooperative communication system thereby adaptively reflecting a channel status.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for setting up a radio front haul link by a serving base station (BS) in a cooperative communication system, the method comprising:
   receiving a measurement result report message including a measurement result for each of a serving BS and neighbor BSs from a mobile station (MS);
   determining at least one neighbor BS with which the serving BS will set up a radio front haul link according to the measurement result for each of the serving BS and the neighbor BSs;
   performing a radio front haul link set up operation with the at least one neighbor BS; and
   if the at least one neighbor BS is a cooperative cell member BS included in a cooperative cell managed by the serving BS, performing a cooperative cell member update operation with the at least one neighbor BS.

2. The method of claim 1, wherein the performing of the radio front haul link set up operation with the at least one neighbor BS comprises:
   performing the radio front haul link set up operation with the at least one neighbor BS according to radio front haul link window information.

3. The method of claim 2, wherein the radio front haul link window information includes information on at least one of a period, a start timing point and a length of a radio front haul link monitoring window.

4. The method of claim 1, further comprising:
   if there is at least one other neighbor BS with which the at least one neighbor BS needs to additionally set up a radio front haul link, controlling the at least one neighbor BS to set up the radio front haul link with the at least one other neighbor BS by notifying the at least one neighbor BS that the at least one neighbor BS need to additionally set up the radio front haul link with the at least one other neighbor BS.

5. The method of claim 1, further comprising:
   transmitting a radio front haul link set up help message which requests a self organizing network (SON) server to transmit a wake up message, indicating that the at least one neighbor BS needs to set up a radio front haul link to the at least one neighbor BS, to the SON server.

6. The method of claim 1, wherein the performing of the radio front haul link set up operation with the at least one neighbor BS comprises:
- broadcasting a radio front haul link set up notification message, indicating that the neighbor BSs needs to set up a radio front haul link with the serving BS and including BS information on the at least one neighbor BS, to neighbor BSs;
- receiving a radio front haul link access request message from the at least one neighbor BS;
- transmitting a radio front haul link access response message to the at least one neighbor BS; and
- setting parameters to be used in a radio front haul link with the at least one neighbor BS.

7. The method of claim 6, wherein the parameters to be used in the radio front haul link includes at least one of radio front haul link identifier (ID) information, security key information and connection ID information.

8. A method for setting up a radio front haul link by a neighbor base station (BS) in a cooperative communication system, the method comprising:
- determining whether a neighbor BS will set up a radio front haul link with a serving BS; and
- performing a radio front haul link setup operation with the serving BS,
- if there is at least one other neighbor BS with which the neighbor BS needs to additionally set up a radio front haul link, receiving a message indicating that the neighbor BS needs to additionally set up a radio front haul link with the at least one other neighbor BS from the serving BS; and
- performing a radio front haul link setup operation with the at least one other neighbor BS.

9. The method of claim 8, wherein the performing of the radio front haul link setup operation with the serving BS comprises:
- performing the radio front haul link setup operation with the serving BS according to radio front haul link window information.

10. The method of claim 9, wherein the radio front haul link window information includes information on at least one of a period, a start timing point and a length of a radio front haul link monitoring window.

11. The method of claim 8, further comprising:
- if the neighbor BS is a cooperative cell member BS included in a cooperative cell managed by the serving BS, performing a cooperative cell member update operation with the serving BS.

12. The method of claim 8, wherein the determining of whether the neighbor BS will set up the radio front haul link with the serving BS comprises:
- receiving a wake up message indicating that the neighbor BS will set up the radio front haul link with the serving BS from a self organizing network (SON) server.

13. The method of claim 8, wherein the performing of the radio front haul link setup operation with the serving BS comprises:
- receiving a radio front haul link set up notification message indicating that the neighbor BS will set up the radio front haul link with the serving BS and including BS information on the neighbor BS;
- transmitting a radio front haul link access request message to the serving BS;
- receiving a radio front haul link access response message from the serving BS; and
- setting parameters to be used in the radio front haul link with the serving BS.

14. The method of claim 13, wherein the parameters to be used in the radio front haul link includes at least one of radio front haul link identifier (ID) information, security key information and connection ID information.

15. A method for setting up a radio front haul link by a mobile station (MS) in a cooperative communication system, the method comprising:
- performing a measurement operation for each of a serving base station (BS) and neighbor BSs; and
- controlling the serving BS and the neighbor BSs to perform a radio front haul link set up operation by transmitting a measurement result report message, including a measurement result for each of the serving BS and the neighbor BSs, to the serving BS,
- wherein controlling the serving BS and the neighbor BSs to perform the radio front haul link set up operation comprises controlling the serving BS and at least one of the neighbor BSs to perform a cooperative cell member update operation if the at least one of the neighbor BSs is a cooperative cell member BS included in a cooperative cell managed by the serving BS.

16. A serving base station (BS) in a cooperative communication system, the serving BS comprising:
- a transceiver configured to receive a measurement result report message including a measurement result for each of a serving BS and neighbor BSs from a mobile station (MS); and
- a controller configured to determine at least one neighbor BS with which the serving BS will set up a radio front haul link according to the measurement result for each of the serving BS and the neighbor BSs, and to perform a radio front haul link set up operation with the at least one neighbor BS,
- wherein, if the at least one neighbor BS is a cooperative cell member BS included in a cooperative cell managed by the serving BS, the controller is further configured to perform a cooperative cell member update operation with the at least one neighbor BS.

17. The serving BS of claim 16, wherein the controller is further configured to perform the radio front haul link set up operation with the at least one neighbor BS based on radio front haul link window information.

18. The serving BS of claim 17, wherein the radio front haul link window information includes information on at least one of a period, a start timing point and a length of a radio front haul link monitoring window.

19. The serving BS of claim 16, further comprising:
- if there is at least one other neighbor BS with which the at least one neighbor BS needs to additionally set up a radio front haul link, the controller is further configured to control the at least one neighbor BS to set up the radio front haul link with the at least one other neighbor BS by controlling the transceiver to notify the at least one neighbor BS that the at least one neighbor BS needs to additionally set up the radio front haul link from the at least one other neighbor BS.

20. The serving BS of claim 16, wherein the transceiver is further configured to transmit a radio front haul link set up help message which requests a self organizing network (SON) server to transmit a wake up message, indicating that a at least one neighbor BS needs to set up a radio front haul link to the at least one neighbor BS, to the SON server.

21. The serving BS of claim 16,
- wherein the transceiver is further configured to:
  - broadcast a radio front haul link set up notification message, indicating that the neighbor BSs needs to set up a radio front haul link with the serving BS and including BS information on the at least one neighbor BS, to neighbor BSs, receive a radio front haul link access request message from the at least one neighbor BS, and transmit a radio front haul link access response message to the at least one neighbor BS, and wherein the controller is further configured to set parameters to be used in a radio front haul link with the at least one neighbor BS.

22. The serving BS of claim 21, wherein the parameters to be used in the radio front haul link includes at least one of radio front haul link identifier (ID) information, security key information and connection ID information.

23. A neighbor base station (BS) in a cooperative communication system, the neighbor BS comprising:

a transceiver configured to receive a radio frequency (RF) signal; and a controller configured to:

detect that a neighbor BS will set up a radio front haul link with a serving BS, and perform a radio front haul link setup operation with the serving BS;

wherein, if there is at least one other neighbor BS with which the neighbor BS needs to additionally set up a radio front haul link, the transceiver is further configured to receive a message indicating that the neighbor BS needs to additionally set up a radio front haul link with the at least one neighbor BS from the serving BS, and wherein the controller is further configured to perform a radio front haul link setup operation with the at least one neighbor BS.

24. The neighbor BS of claim 23, wherein the controller is further configured to perform the radio front haul link setup operation with the serving BS according to radio front haul link window information.

25. The neighbor BS of claim 24, wherein the radio front haul link window information includes information on at least one of a period, a start timing point and a length of a radio front haul link monitoring window.

26. The neighbor BS of claim 23, wherein the controller is configured to perform a cooperative cell member update operation with the serving BS if the neighbor BS is a cooperative cell member BS included in a cooperative cell managed by the serving BS.

27. The neighbor BS of claim 23, wherein the transceiver is further configured to receive a wake up message indicating that the neighbor BS will set up the radio front haul link with the serving BS from a self organizing network (SON) server.

28. The neighbor BS of claim 23, wherein the transceiver is further configured to:

transmit a radio front haul link access request message to the serving BS, receive a radio front haul link set up notification message indicating that the neighbor BS needs to set up the radio front haul link with the serving BS and including BS information on the neighbor BS, and receive a radio front haul link access response message from the serving BS, and wherein the controller is further configured to set parameters to be used in the radio front haul link with the serving BS.

29. The neighbor BS of claim 28, wherein the parameters to be used in the radio front haul link includes at least one of radio front haul link IDentifier (ID) information, security key information and connection ID information.

30. A mobile station (MS) in a cooperative communication system, the MS comprising:

a controller configured to perform a measurement operation for each of a serving base station (BS) and neighbor BSs; and a transceiver configured to transmit a radio frequency (RF) signal, wherein the controller is configured to control the serving BS and the neighbor BSs to perform a radio front haul link set up operation by controlling the transceiver to transmit a measurement result report message including a measurement result for each of the serving BS and the neighbor BSs to the serving BS, and to control the serving BS and the neighbor BSs to perform the radio front haul link set up operation comprises controlling the serving BS and at least one of the neighbor BSs to perform a cooperative cell member update operation if the at least one of the neighbor BSs is a cooperative cell member BS included in a cooperative cell managed by the serving BS.

* * * * *